United States Patent
Yuan et al.

(10) Patent No.: US 12,175,172 B1
(45) Date of Patent: *Dec. 24, 2024

(54) FROZEN BOUNDARY MULTI-DOMAIN PARALLEL MESH GENERATION

(71) Applicant: ANSYS, Inc., Canonsburg, PA (US)

(72) Inventors: Wei Yuan, Sewickley, PA (US);
Yunjun Wu, Pittsburgh, PA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,111

(22) Filed: Sep. 20, 2023

Related U.S. Application Data

(63) Continuation of application No. 16/550,666, filed on Aug. 26, 2019, now Pat. No. 11,797,730.

(60) Provisional application No. 62/757,497, filed on Nov. 8, 2018.

(51) Int. Cl.
*G06F 30/23* (2020.01)
*G06F 115/10* (2020.01)
*G06F 111/10* (2020.01)
*H04L 12/28* (2006.01)

(52) U.S. Cl.
CPC .......... *G06F 30/23* (2020.01); *G06F 2111/10* (2020.01); *G06F 2115/10* (2020.01); *H04L 12/28* (2013.01)

(58) Field of Classification Search
CPC .. G06F 30/23; G06F 2111/10; G06F 2115/10; H04L 12/28
USPC .......................................................... 703/2
See application file for complete search history.

(56) References Cited

U.S. PATENT DOCUMENTS

2014/0039847 A1* 2/2014 Georgescu .............. G06F 30/15
703/1

OTHER PUBLICATIONS

Chen, Jianjun, et al. "Improvements in the reliability and element quality of parallel tetrahedral mesh generation." International Journal for Numerical Methods in Engineering 92.8 (2012): 671-693. (Year: 2012).*

Hachemi, Mohamed El, et al. "A low-order unstructured-mesh approach for computational electromagnetics in the time domain." Philosophical Transactions of the Royal Society of London. Series A: Mathematical, Physical and Engineering Sciences 362.1816 (2004): 445-469. (Year: 2004).*

* cited by examiner

*Primary Examiner* — John E Johansen
(74) *Attorney, Agent, or Firm* — Douglas A. Gastright

(57) ABSTRACT

A computer-implemented method for meshing a model of a physical electro-magnetic assembly is disclosed. The method includes separating the base mesh of the model into two domains and freezing the boundary between these domains. Each domain is then sent for mesh refinement by separate computer processors. Each computer processor generates a refined mesh of the respective domain without communication between processors. Two-way boundary mesh mapping is then performed, resulting in a global conformal mesh. Surface recovery and identity assignment are then performed by separate computer processors in parallel for each domain, without communication between processors. Related apparatus, systems, techniques, methods and articles are also described.

18 Claims, 35 Drawing Sheets

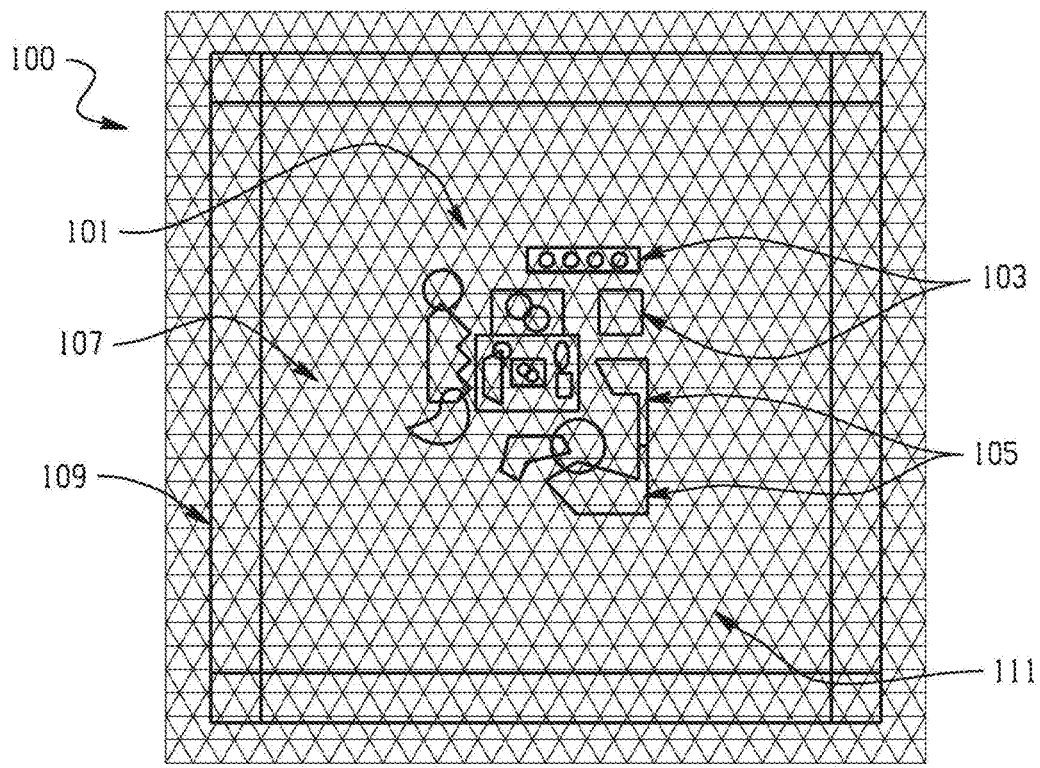
*Fig. 1A* (CONVENTIONAL)
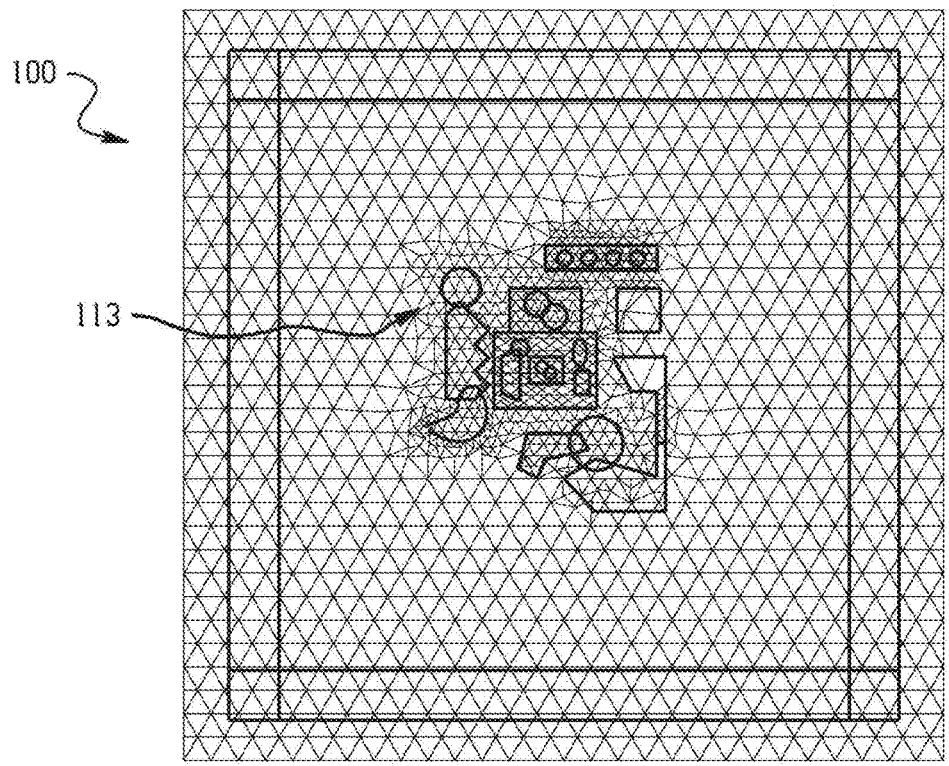
*Fig. 1B* (CONVENTIONAL)

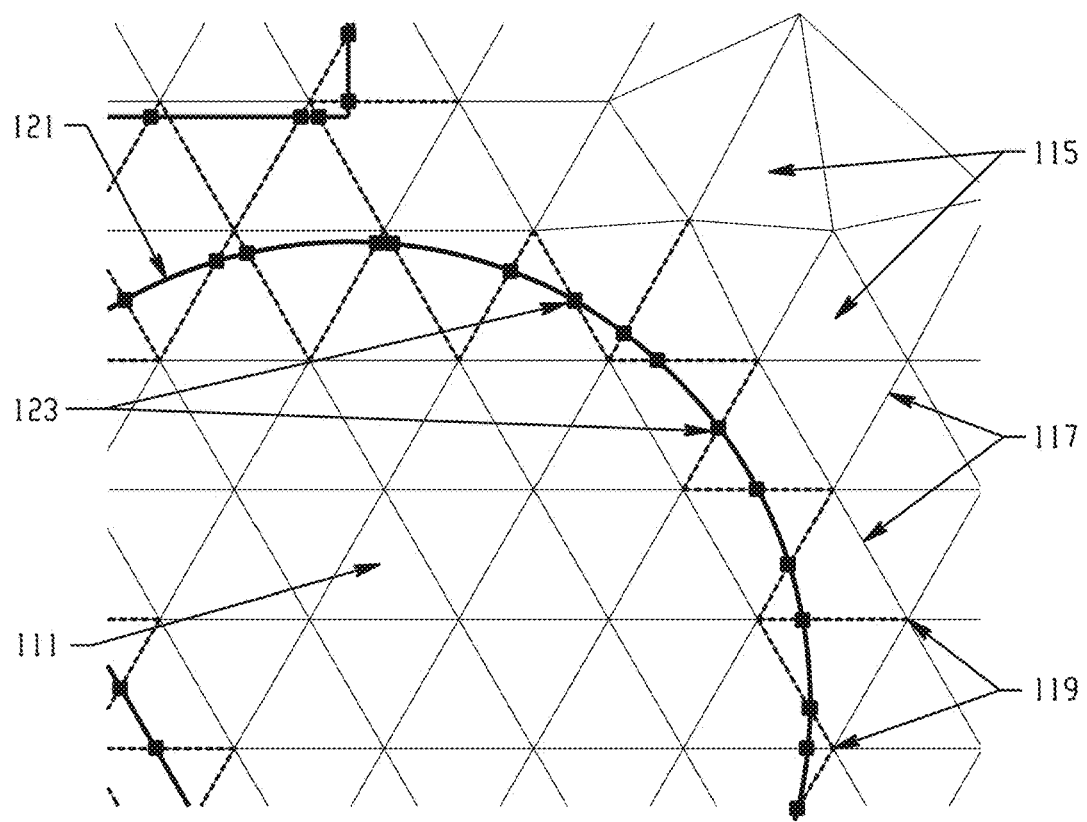
Fig. 1C (CONVENTIONAL)
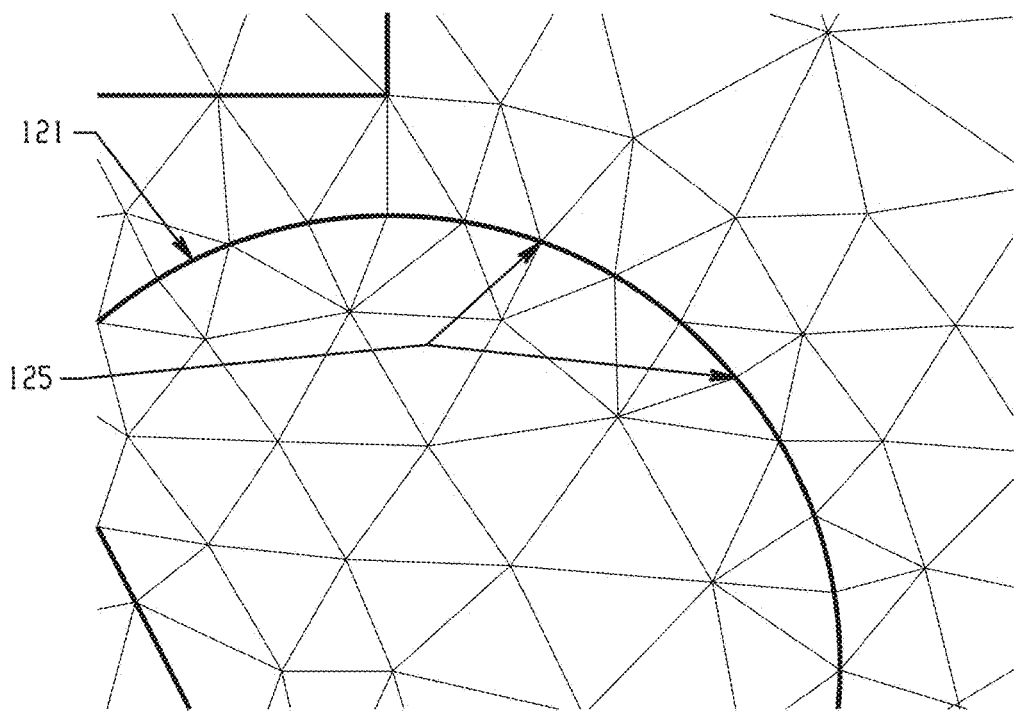
Fig. 1D (CONVENTIONAL)

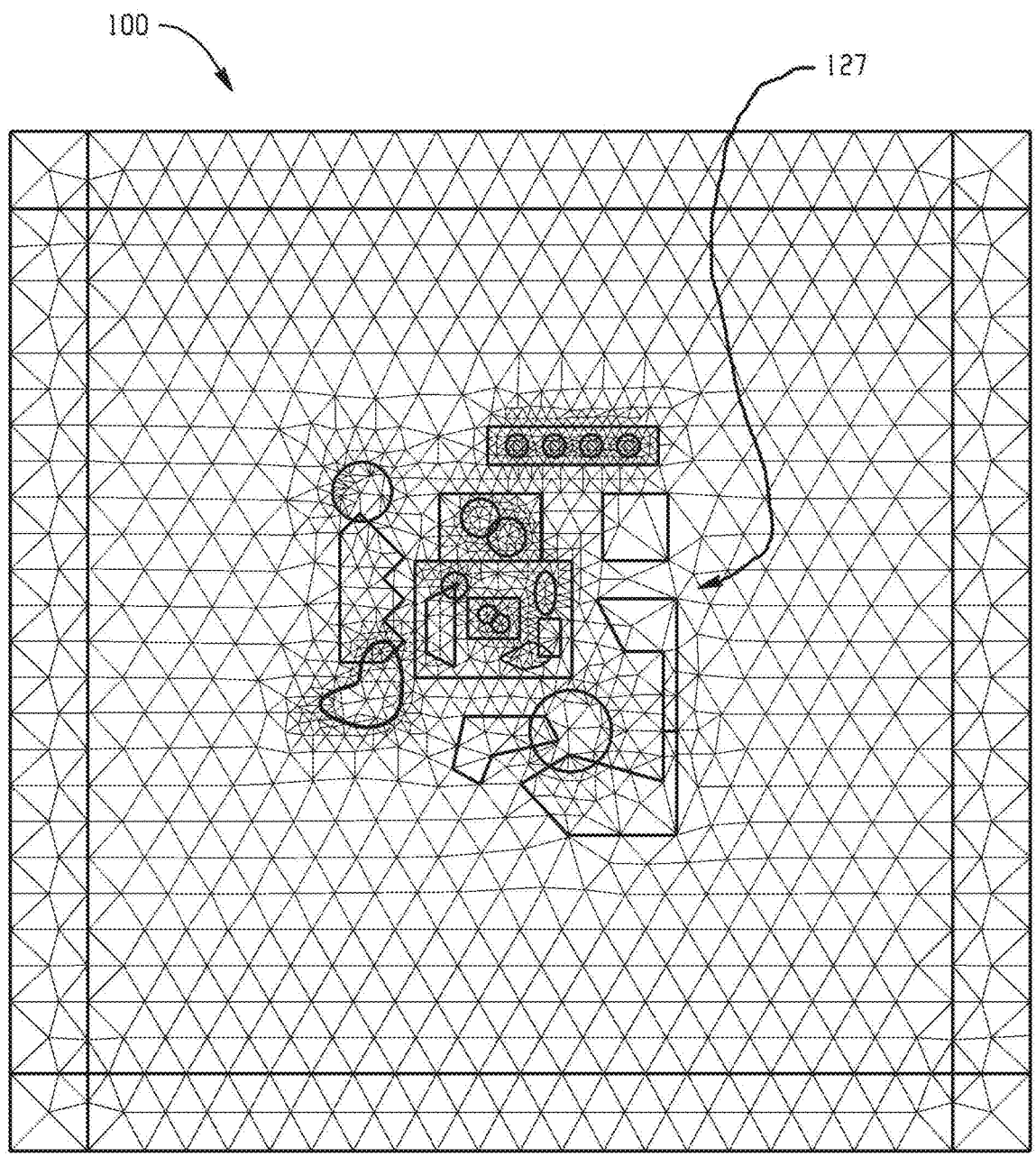
Fig. 1E (CONVENTIONAL)

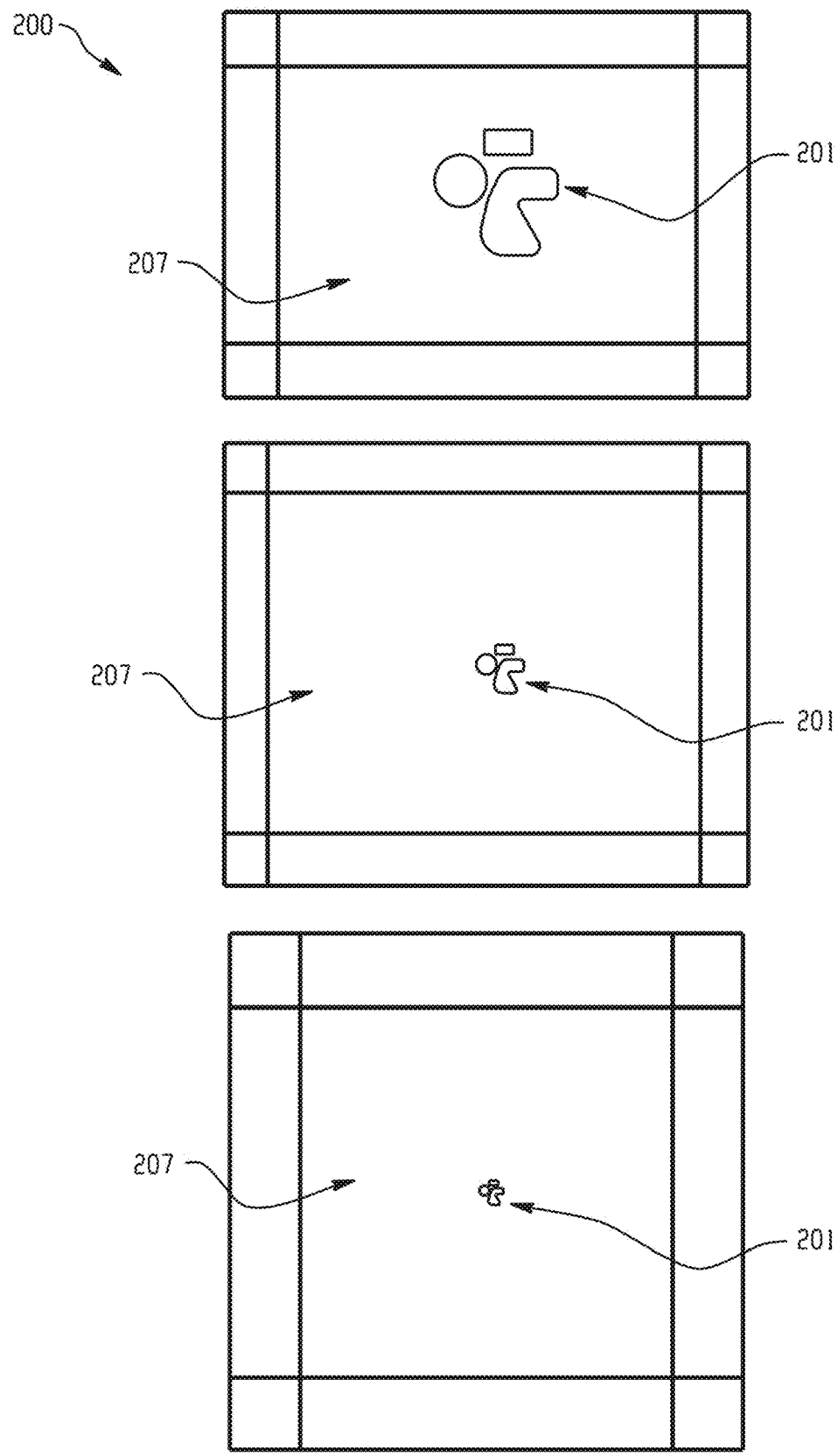
Fig. 2A (CONVENTIONAL)

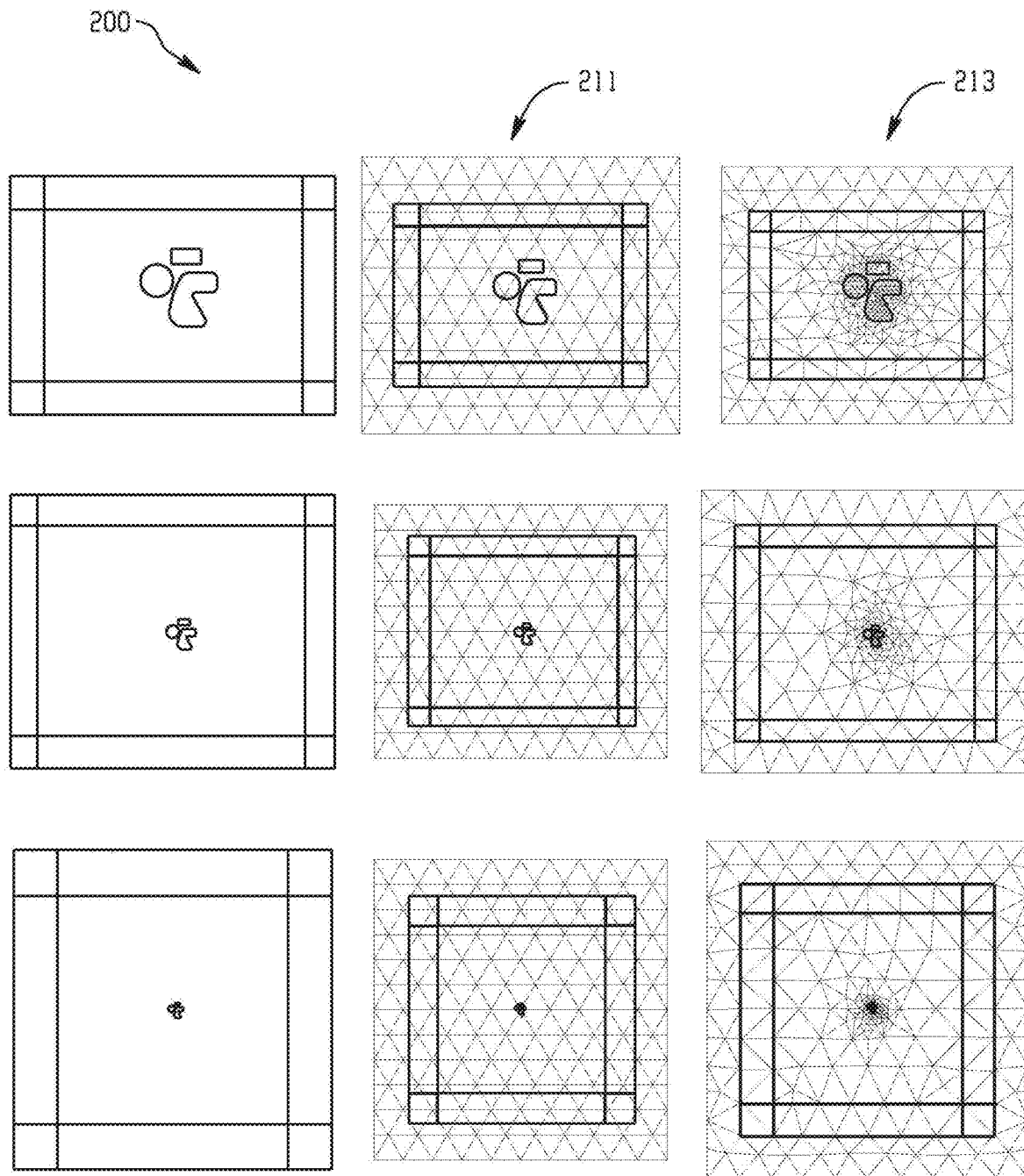
Fig. 2B (CONVENTIONAL)

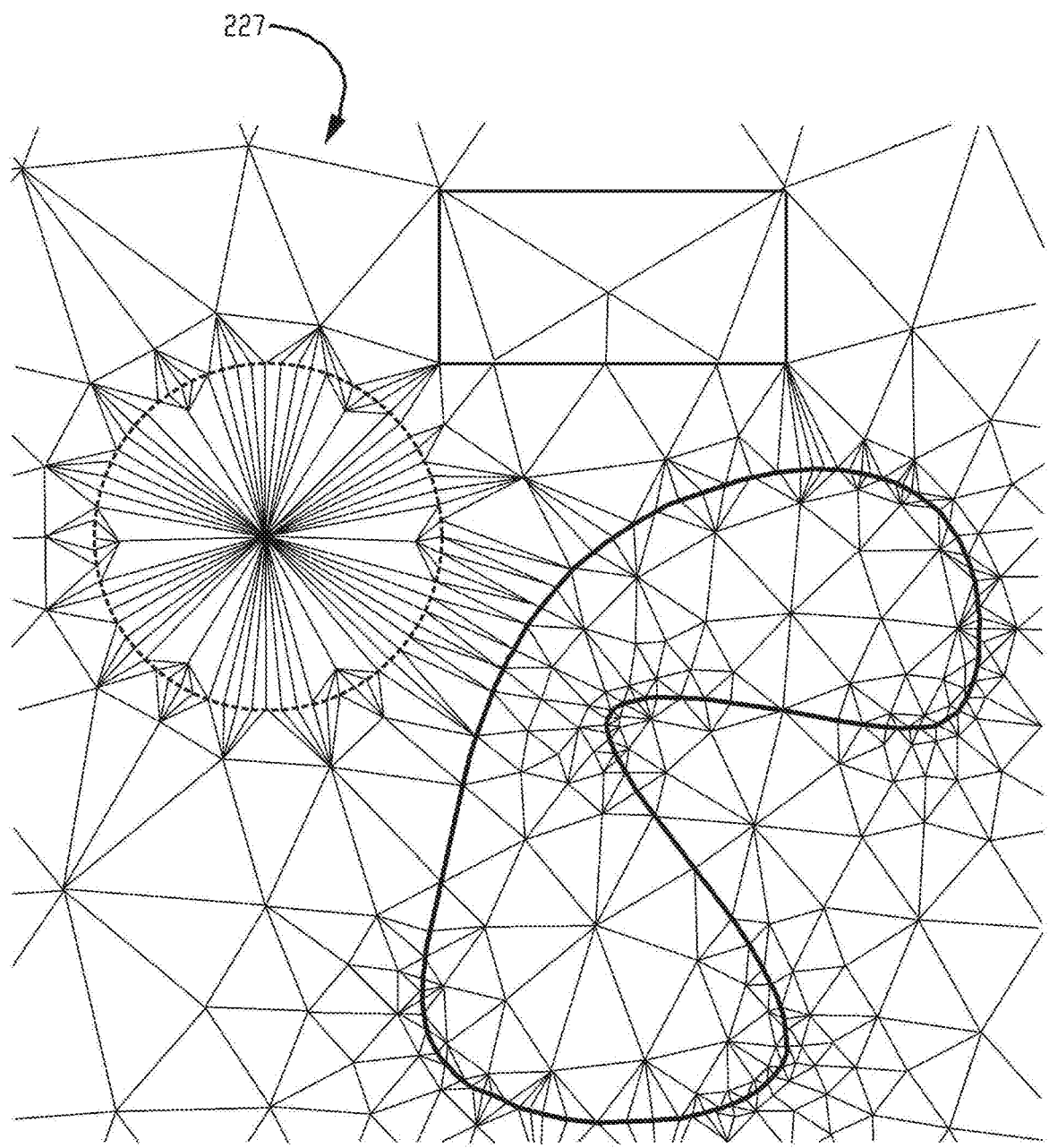
Fig. 2C (CONVENTIONAL)

FROZEN BOUNDARY MULTI-DOMAIN PARALLEL MESH GENERATION

CROSS REFERENCE TO RELATED APPLICATIONS

This application is a continuation application of U.S. application Ser. No. 16/550,666, filed Aug. 26, 2019, entitled "Frozen Boundary Multi-Domain Parallel Mesh Generation", issued as U.S. Pat. No. 11,797,730 on Oct. 24, 2023, which claims priority to U.S. Provisional Patent Application No. 62/757,497, filed Nov. 8, 2018, entitled "Frozen Boundary Parallel Mesh Generation", both of which are hereby incorporated by reference in their entirety.

TECHNICAL FIELD

The subject matter described herein relates to computer aided engineering (CAE) methods, and more specifically to a multi-domain conformal mesh generation in parallel for a finite element model of a physical system.

BACKGROUND

Mesh generation for finite element analysis (FEA) of systems such as electro-magnetic (EM) physical systems is a complex process. It is time consuming, computationally intensive, and costly. Known methods of conformal mesh generation of such models are slow, in part because they cannot take advantage of all computer resources through parallel processing. They are also inefficient when meshing a large full model with single domain by one processor or meshing with multiple domains with heavy network data exchanges among domains to ensure conformal mesh. Resulting meshes may be inconsistent, because of different amount of padding added at different frequencies. Mesh problems leading to non-convergence are hard to debug because the meshes are so large.

Decomposing a complex model into multiple domains is a bottleneck, and utilizing separate computer processors to mesh individual domains in parallel may not result in computational cost savings with conventional methods. In such attempts, these separate computer processors need to constantly communicate with each other as the meshes for separate domains are refined, recovered, and constantly keep changing, in order to ensure a conformal mesh on the boundary between these domains. This leads to extensive input/output commands, which are computationally expensive. The resulting delays typically offset any time savings from meshing separate domains by separate computer processors.

SUMMARY

Computer-implemented method of meshing a model of a physical electro-magnetic assembly may start with creating a base mesh of the model. The base mesh may include a first part of a first domain and a second part of a second domain. The first part of the first domain may be adjacent to the second part of the second domain via a boundary with boundary nodes. At this time, the boundary nodes of the first domain match the boundary nodes of the second domain, and vice versa, which is called a conformal mesh. The first domain may be sent to a first computer processor for mesh refinement with the boundary nodes indicated as frozen. The second domain may be sent to a second computer processor for mesh refinement with the boundary nodes indicated as frozen. The first domain mesh, refined from the first part of the first domain, may be received from the first computer processor. The second domain mesh, refined from the second part of the second domain, may be received from the second computer processor. The first domain mesh and the second domain mesh may be combined to generate a conformal mesh of the model.

The method may also include adding nodes from the first domain mesh that were not on the frozen boundary prior to sending the first domain for mesh refinement to the frozen boundary. The nodes from the second domain mesh that were not on the frozen boundary prior to sending the second domain for mesh refinement may also be added to the frozen boundary.

The first domain and the second domain may be sent for surface recovery and identity assignment by separate computer processors working in parallel without communication with each other. The first domain mesh and the second domain mesh may be graphically rendered. Paddings and perfectly matched layers of the model may be selected as a boundary domain. This selection may occur prior to creating the base mesh of the model. The first domain may include the model prior to selecting the boundary domain. The second domain may include the boundary domain. The frozen boundary may include an internal boundary of the boundary domain.

The method may also include mapping base mesh to bound domains. Mesh of bound domains may be decomposed into a first bound domain mesh and a second bound domain mesh. The first part of the first domain may include the first bound domain mesh, and the second part of the second domain may include the second bound domain mesh.

An overlapping mesh may be configured for a component. An island mesh group may be decomposed, and a geometry object may be decomposed to a component domain. The first domain may include the island mesh group, while the second domain may include an excluded bound domain. The method may also include shrinking the base mesh to correct misalignment between the base mesh and the first domain.

The method may also include combining the first domain and the second domain into a single domain. The boundary between the first domain and the second domain may be pre-meshed to create a clean interface between the first domain and the second domain. The single domain may be decomposed into the first domain and the second domain at the clean interface. Geometry features of the first domain and of the second domain may align at the boundary between the first domain and the second domain.

The model may include a component domain with a plurality of objects. Creating a base mesh of the model may involve dividing the component domain into the first set of objects and the second set of objects. It may also involve identifying a domain interface between the first set of objects and the second set of objects and meshing that domain interface. The component domain may be decomposed into a first sub-domain and a second sub-domain. The first part of the base mesh may include the first sub-domain. The second part of the base mesh may include the second sub-domain. The boundary between the first domain and the second domain may include the domain interface.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. These advantages include significant time savings in generating a global conformal mesh for a finite-element model of an electro-magnetic physical system. Additionally, meshes for analyses at different frequencies are more consistent. Furthermore, using a frozen boundary method allows for more efficient meshing of bound domains, misaligned domains, domains with island components, domains where geometric features are aligned on domain boundary, and component domains.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 1A-1E are diagrams illustrating a conventional single-domain meshing.

FIGS. 2A-2C are diagrams illustrating a conventional meshing of electro-magnetic models at different frequencies.

Like reference symbols in the various drawings indicate like elements.

DETAILED DESCRIPTION

Figure 6A:
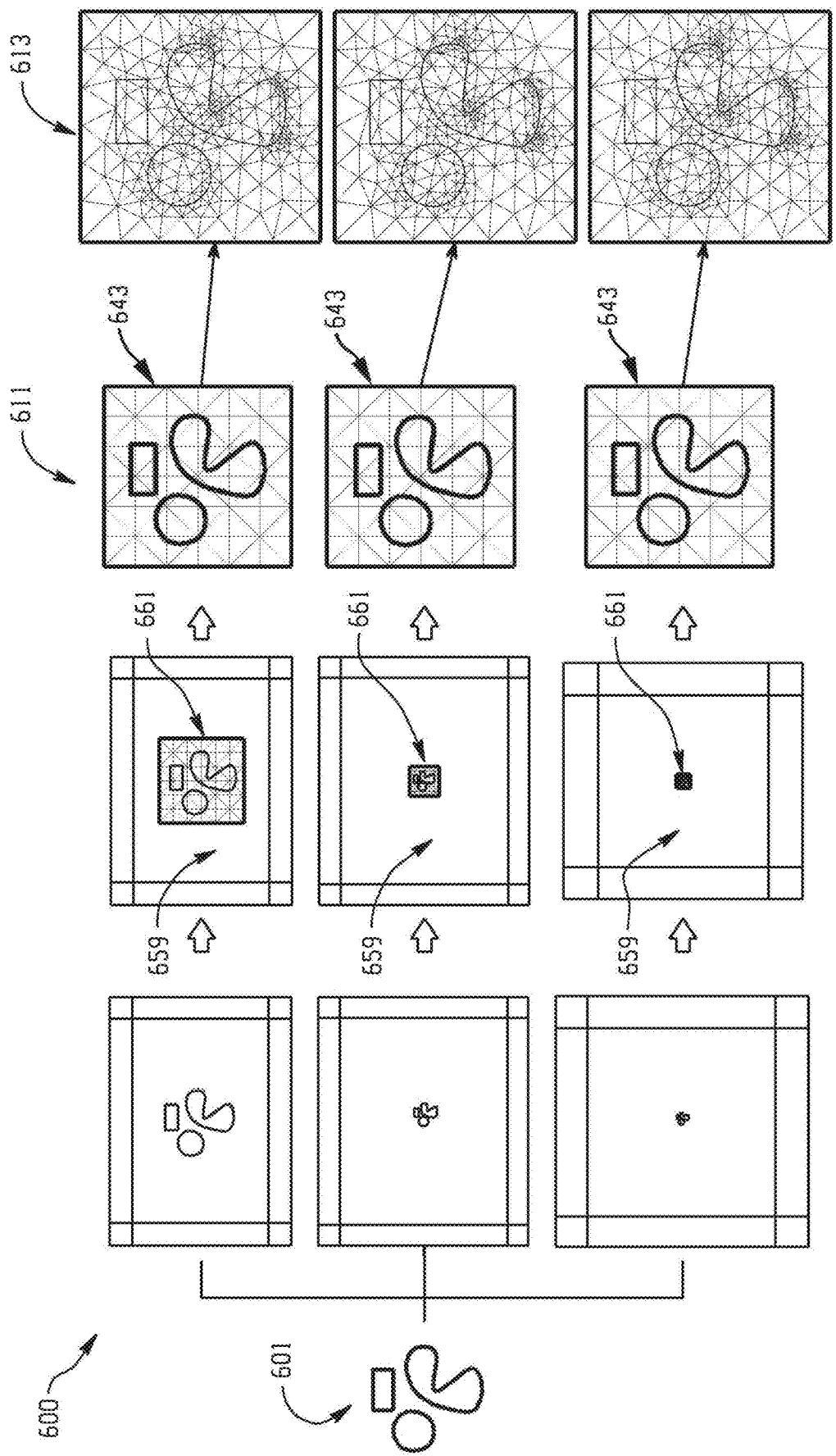
FIGS. 6A-6B are diagrams illustrating application of a frozen boundary method to electro-magnetic modeling at various frequencies, according to one embodiment.
Figure 6B:
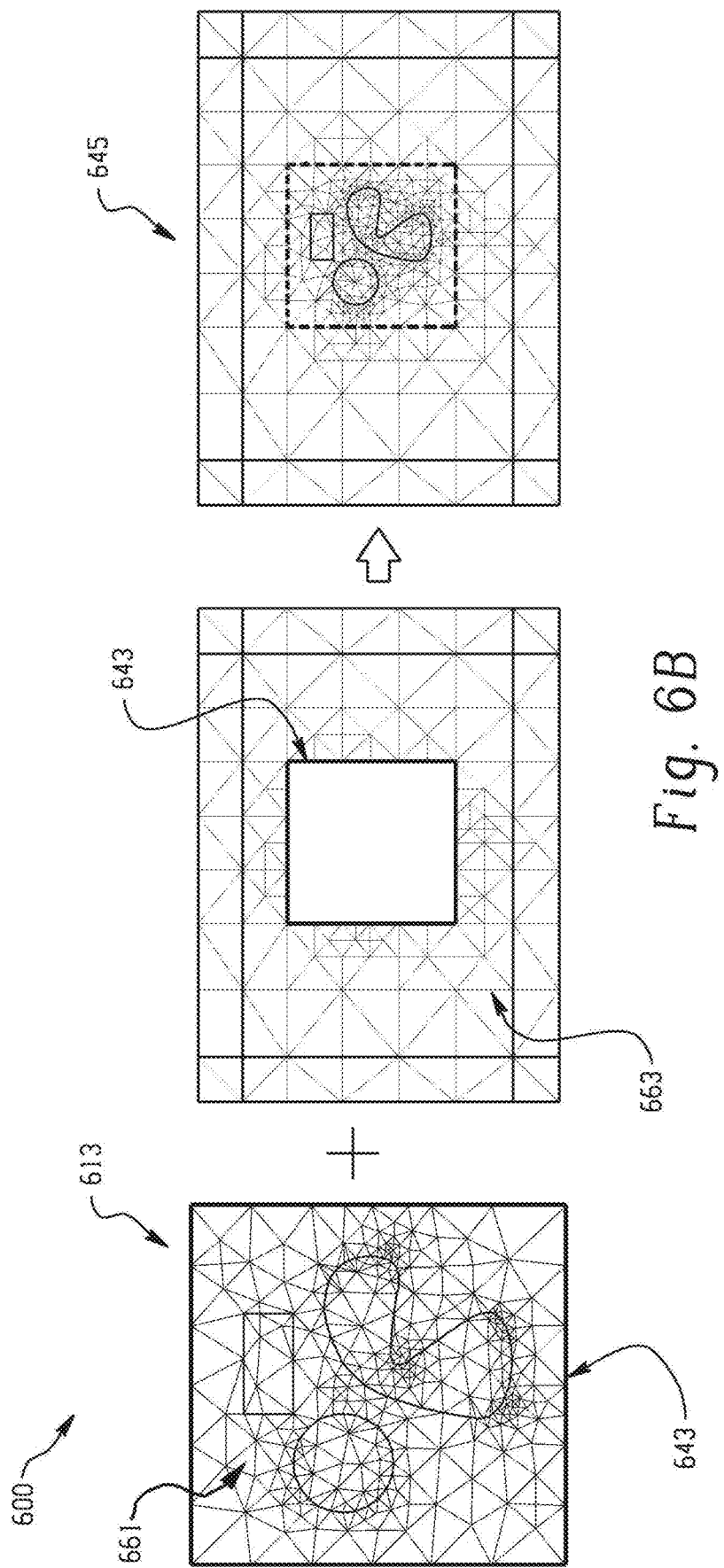
Figure 7:
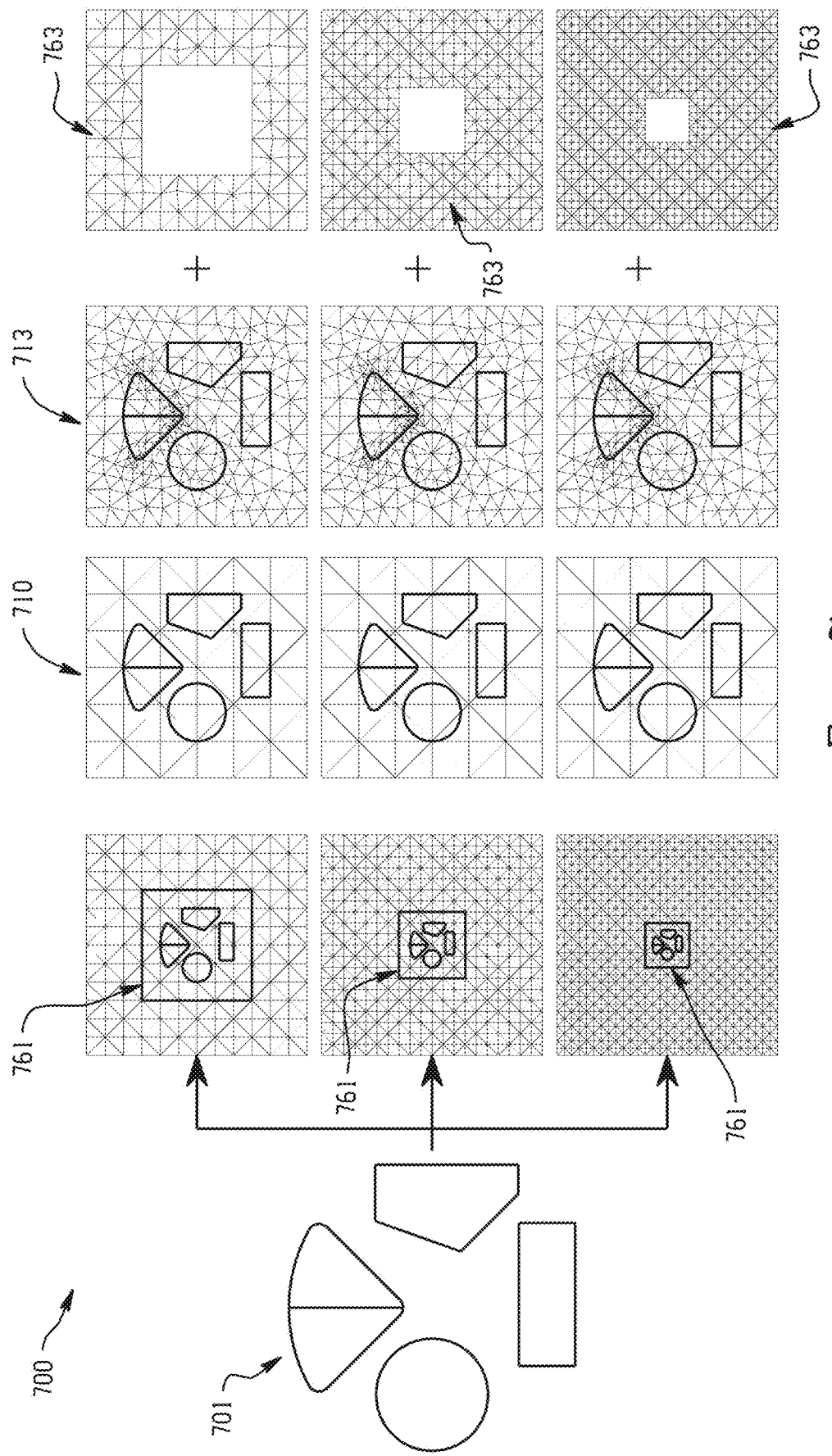
FIG. 7 is a diagram illustrating application of a frozen boundary method to electro-magnetic modeling at various frequencies, according to one embodiment.
Figure 15A:
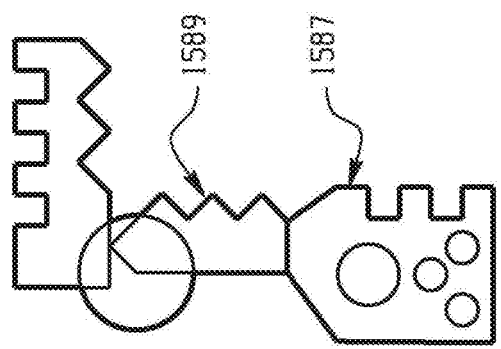
FIGS. 15A-15B are diagrams illustrating application of a frozen boundary method to component sets, according to one embodiment.
Figure 15A:
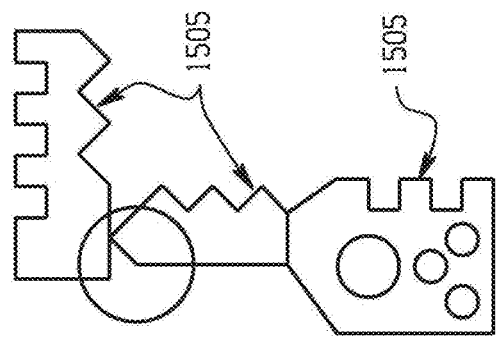
Figure 15A:
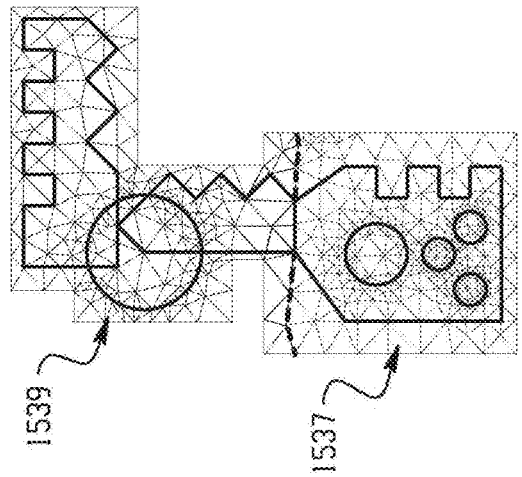
Figure 15A:
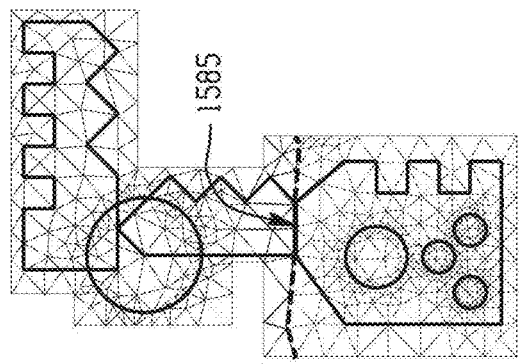
Figure 15A:
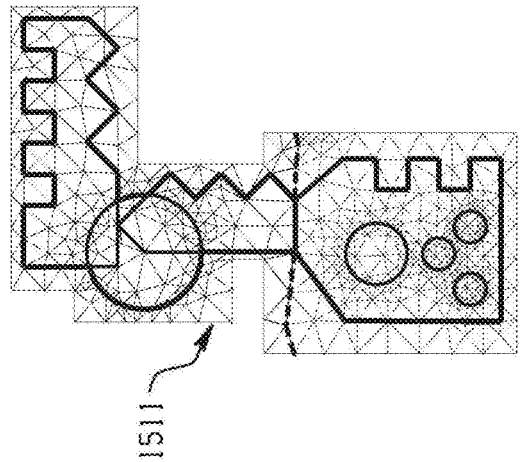
Figure 15B:
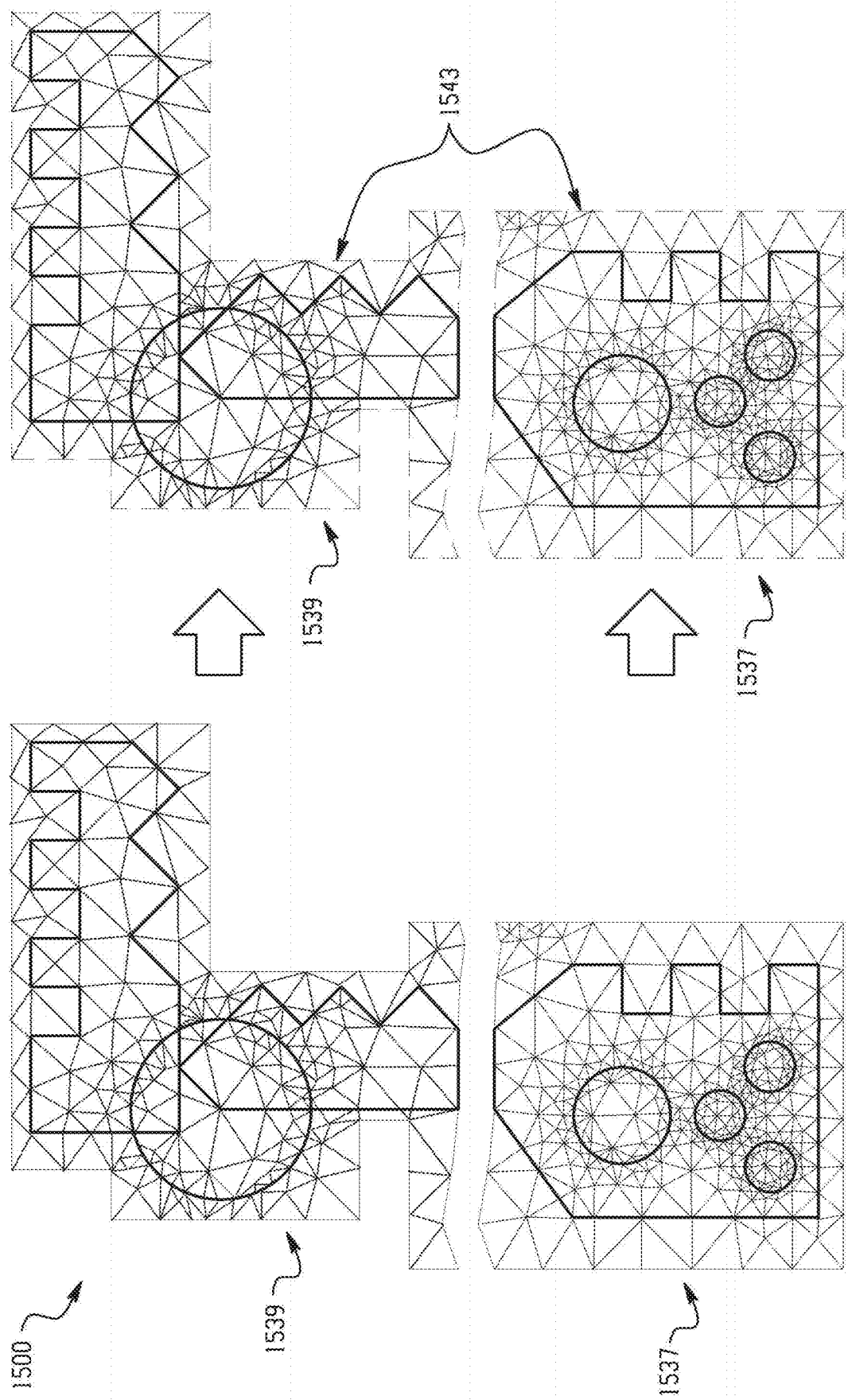
Figure 16:
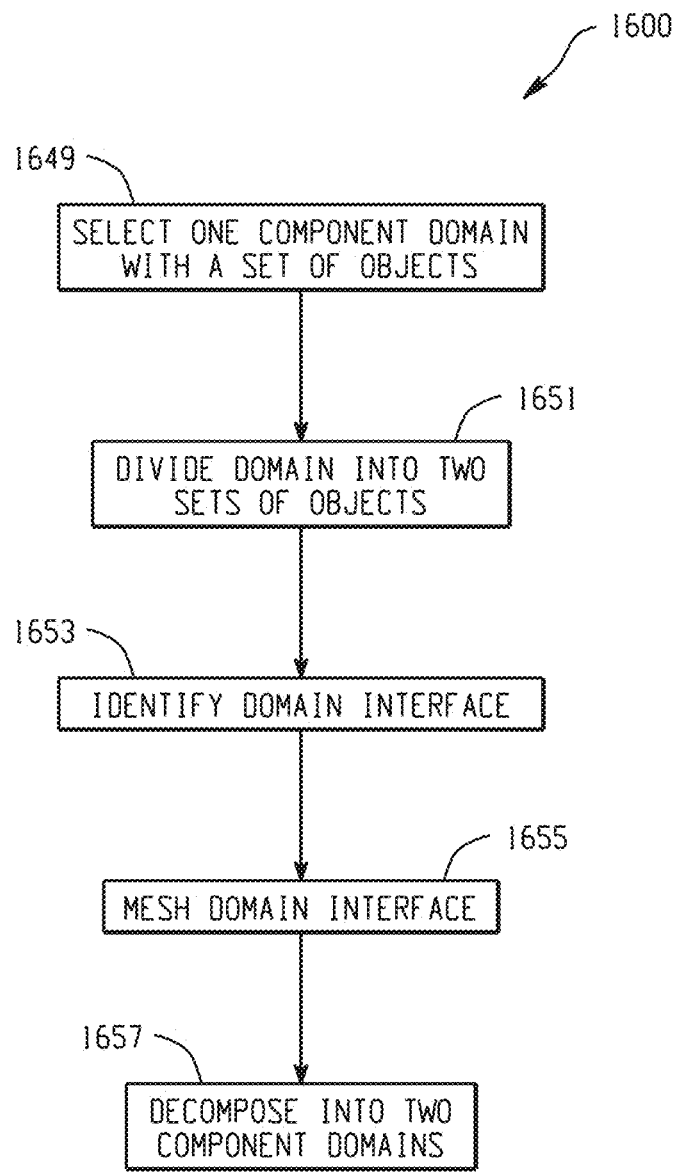
FIG. 16 is a flow diagram depicting a processor-implemented method for application of a frozen boundary method to component sets, according to one embodiment.

To effectively describe the frozen boundary multi-domain parallel meshing method, a conventional method of mesh generation will first be described with reference to FIGS. 1A-1E. Further, since one of the intended applications of the frozen boundary method is a multi-frequency electro-magnetic simulation, a conventional method of meshing an electro-magnetic model at various frequencies will also be described in reference to FIGS. 2A-2C. This discussion of conventional approaches will be followed by an overview of the frozen boundary multi-domain parallel meshing method (FIGS. 3A-3G, 4A-4D, and 5) and its application to a multi-frequency electro-magnetic simulation (FIGS. 6A-6B and 7). This will be followed by the discussion of the frozen boundary method's application to special cases of bound domains (FIGS. 8A-8C and 9), domains with island components (FIGS. 10A-10E and 11), misaligned domains (FIGS. 12A-12B), domains where geometric features are aligned on shared domain boundary (FIGS. 13A-13B and 14), and common component domains (FIGS. 15A-15B and 16).

FIGS. 1A-1E are diagrams illustrating a conventional single-domain meshing. A conventional meshing of an electro-magnetic (EM) finite-element model (FEM) for finite element analysis (FEA) starts with a coarse volume base mesh (or base volume mesh), as shown in FIG. 1A. EM model 101 may consist of one or more domains, each of which may include multiple objects 103. Some objects may contain multiple components 105. In a typical EM simulation, air padding buffer (padding) 107 is added all around the model 101. Perfectly matched layers (PMLs) 109 are typically added on the periphery. PML is an artificial absorbing layer for wave equations and may be used to truncate computational regions in an FEA simulation of problems with open boundaries. PMLs absorb outgoing waves from the interior of a computational region without reflecting them back into the interior. Base mesh 111 is then applied to the full system 100, where the system 100 includes the model 101, padding 107, and PMLs 109. The next step of a conventional single-domain meshing is a mesh refinement to capture model details or demanded by simulation, as illustrated in FIG. 1B. In this step, initial coarse mesh of the model is refined, resulting in a refined mesh 113. Base mesh means a coarse mesh, typically prior to mesh refinement.

After mesh refinement, surface recovery can be performed to eliminate all cutting mesh edges, as shown in FIGS. 1C-1D. Specifically, refined mesh 111 consists of elements 115, which may be two dimensional (e.g., triangles or trapezoids) in a two-dimensional model, or three-dimensional (e.g., tetrahedrons or hexahedrons) in a three-dimensional model. Each element 115 includes edges 117 in a 2D model. Each element in a 3D model also includes faces, each face including multiple edges. Each element 115 also includes multiple vertices or nodes 119. Some edges 117 may intersect boundary 121 of a modelled object 103 at the intersection points 123. Then a boundary mesh is mapped to the model, as shown in FIG. 1D. A boundary mesh is a mesh representation of a boundary of an object. In this process, some nodes are moved or inserted, and some edges are swapped, so that they end up as nodes 125 laying on the object boundary 121. This process is called surface recovery. Finally, FIG. 1E shows mapping of volume mesh to the correct objects. The map between elements and the objects is built, i.e., element x is assigned to object A, element y is assigned to object B, etc. This process is called Solid ID assignment. The resulting mesh 127 is conformal. However, it is a large global mesh, not well suited for parallel formation and processing. From a topological point of view, a conformal mesh is a mesh where the intersection between any two elements is a sub-element of both elements, such as a face, an edge, a node or nothing (the void set). For a mesh composed of triangular elements, conformal mesh is a mesh where every pair of adjacent elements can only intersect at a vertex or an edge.

FIGS. 2A-2C are diagrams 200 illustrating a conventional one-domain meshing of electro-magnetic (EM) models for simulations at different electro-magnetic wave frequencies. FIG. 2A shows three examples representing the same EM model 201 at three different frequencies. Depending on the frequency, the size of padding 207 that should be added to the model 201 varies. Typically, more padding is used for longer wave lengths (i.e., for lower frequencies). For example, top row of FIG. 2B may correspond to frequencies in a MHz range, middle row may correspond to frequencies in the kHz range, and the bottom row may correspond to frequencies in Hz range. FIG. 2B shows what happens when a conventional meshing process (as described in FIGS. 1A-1E) is applied to EM models at different frequencies. The coarse base mesh 211 is first applied. It is then refined to obtain a refined mesh 213. Meshes of the padding region may be of similar density and of acceptable quality at each of the three frequencies in this example. However, for frequencies where a large size padding is added (like the bottom row of images in FIG. 2B), mesh of the model 201 is inadequate. In the example shown, domain mesh contains 988 triangle elements in the top row, 692 triangle elements in the middle row, and 548 triangle elements in a bottom row. FIG. 2C shows the final mesh 227 for the case illustrated in the bottom row of FIG. 2B. It is readily observed that the conventional method may result in a poor quality mesh with unnecessary high mesh density in some areas, low mesh density in other areas, and very high aspect ratios of some mesh elements. For the same EM model 201, although the model is the same for the three rows, the mesh of model 201 at three frequencies are different in size and quality.

Systems and methods described herein provide procedures for multi-domain parallel conformal mesh generation method based on a frozen boundary concept, which can overcome the issues encountered in the conventional methods by providing a conformal mesh using multiple processors with minimum network data communication. The proposed boundary domain isolated mesh generation method can provide consistent mesh when different paddings are added at different frequencies in an effective way to achieve accurate simulation results. The proposed geometry-mesh coupling domain decomposition method can decompose the model into more sub-domains for full use of available computer resources. Systems and methods described herein may be applicable to electro-magnetic simulation, mechanical simulation, fluid simulation, and other simulation processes that involve finite element meshing.

Figure 3A:
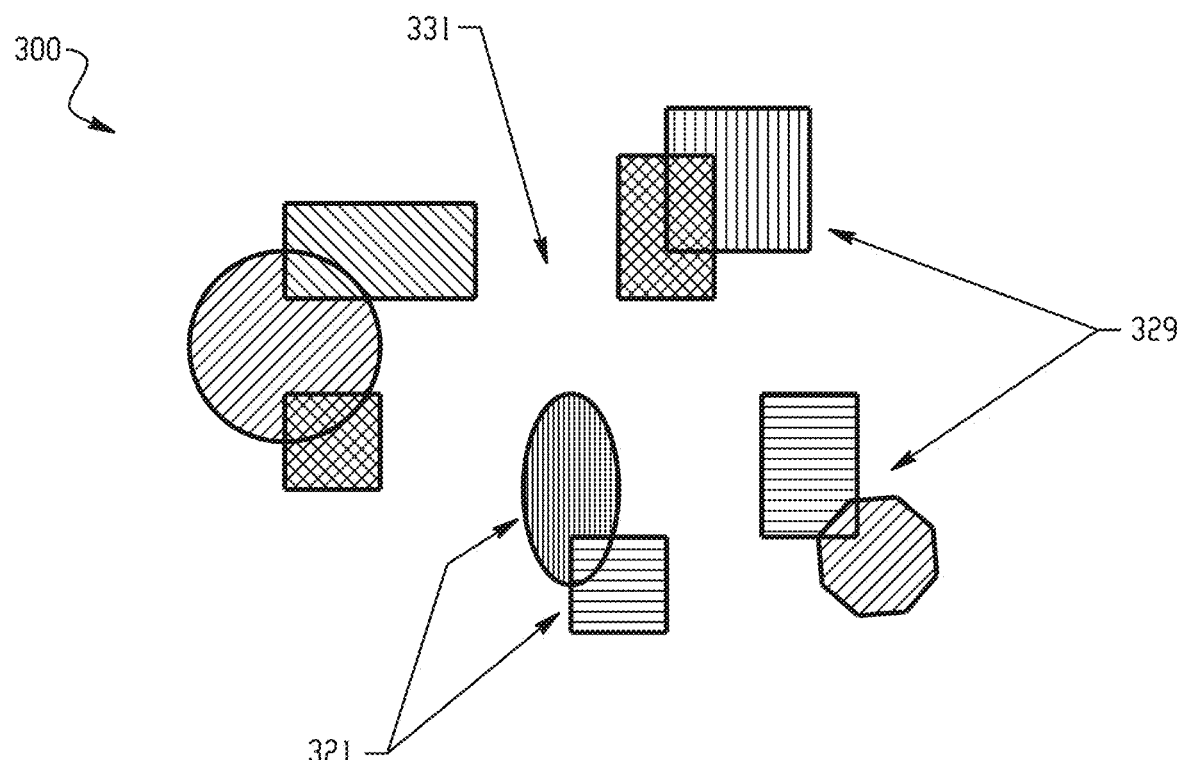
FIGS. 3A-3G are diagrams illustrating a domain decomposition method according to one embodiment.
Figure 3B:
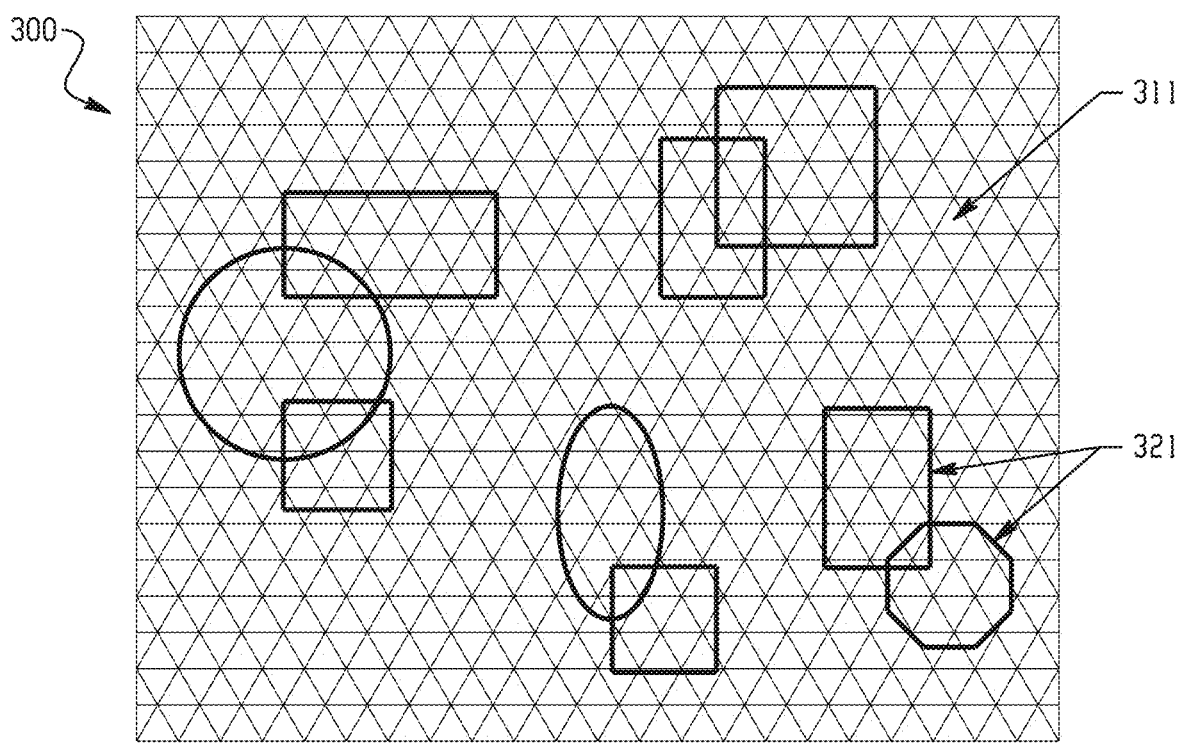
Figure 3C:
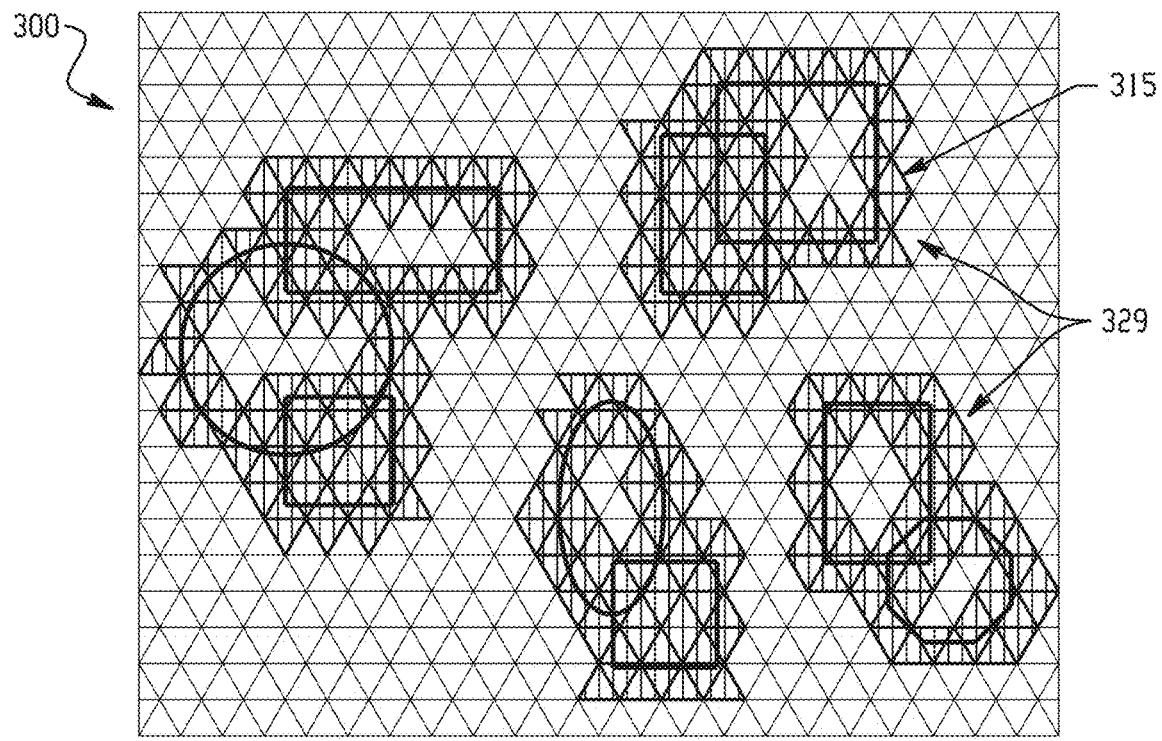
Figure 3D:
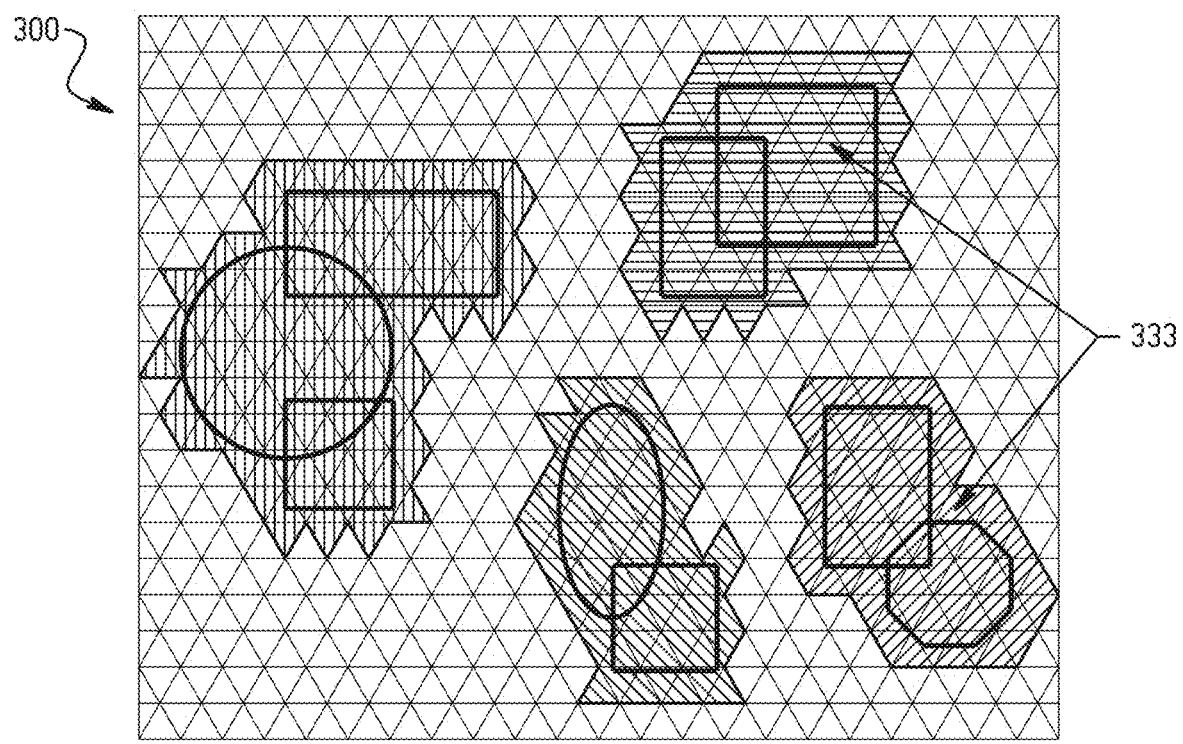
Figure 3E:
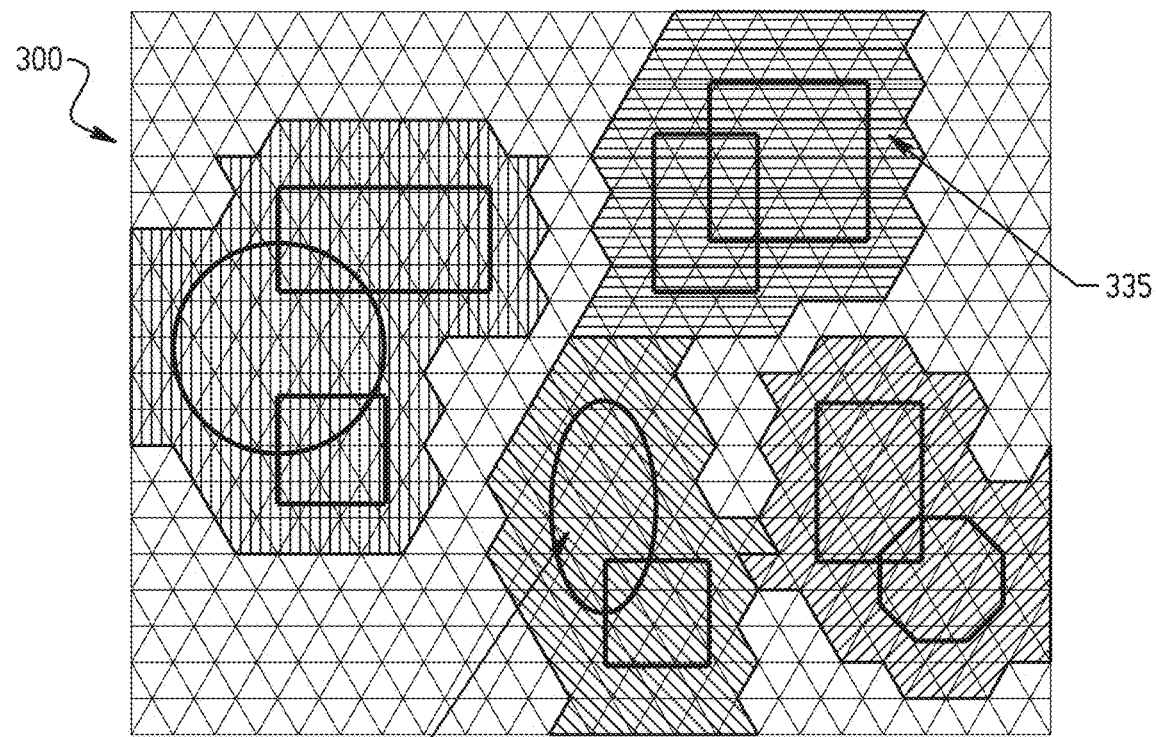
Figure 3F:
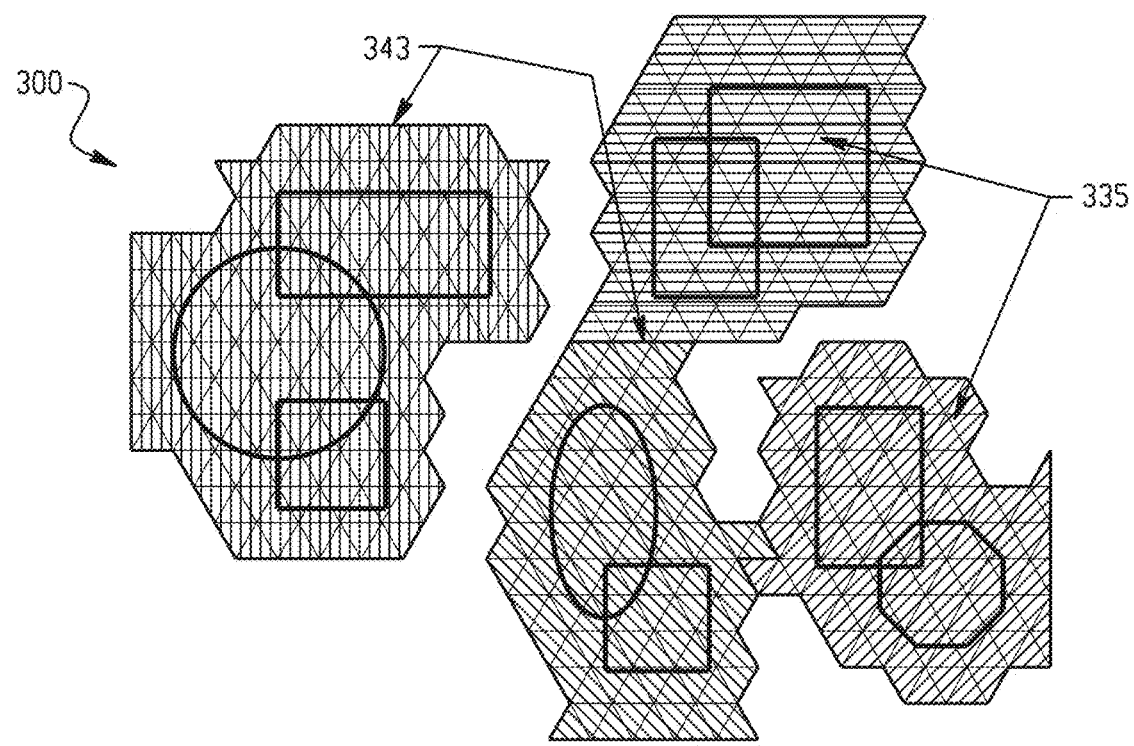

FIGS. 3A-3G are diagrams illustrating a frozen boundary method according to one embodiment. The method may start with automated sub-domain decomposition as shown in FIGS. 3A-3F. FIG. 3A shows a model 300 consisting of multiple components 329. A component 329 may contain one or more tightly contacted objects 321. Model 300 may also have void space 331 in between some of the components 329. A base volume mesh 311 may be built or generated to represent model 300, as shown in FIG. 3B. All mesh elements overlapping with the components 329 may be marked as overlapping elements 315, as shown in FIG. 3C. As shown in FIG. 3D, initial sub-domains 333 may be built (or identified, established) by the overlapping mesh elements. To finalize build-up of domains (or sub-domains) 335 as shown in FIG. 3E, a layer of elements surrounding sub-domains 333 may be added to each sub-domain 333. Boundary 343 of each domain 335 may now be defined, as shown in FIG. 3F. Defining a boundary of the domain means identifying the interface connecting two sub-domains. Boundary then may include nodes and edges in a two-dimensional model, and may include nodes, edges, and triangles in a three-dimensional model. Establishment of a domain may inherently define the boundary of that domain. This may complete decomposition of the model into multiple domains with boundaries between them.

Figure 3G:
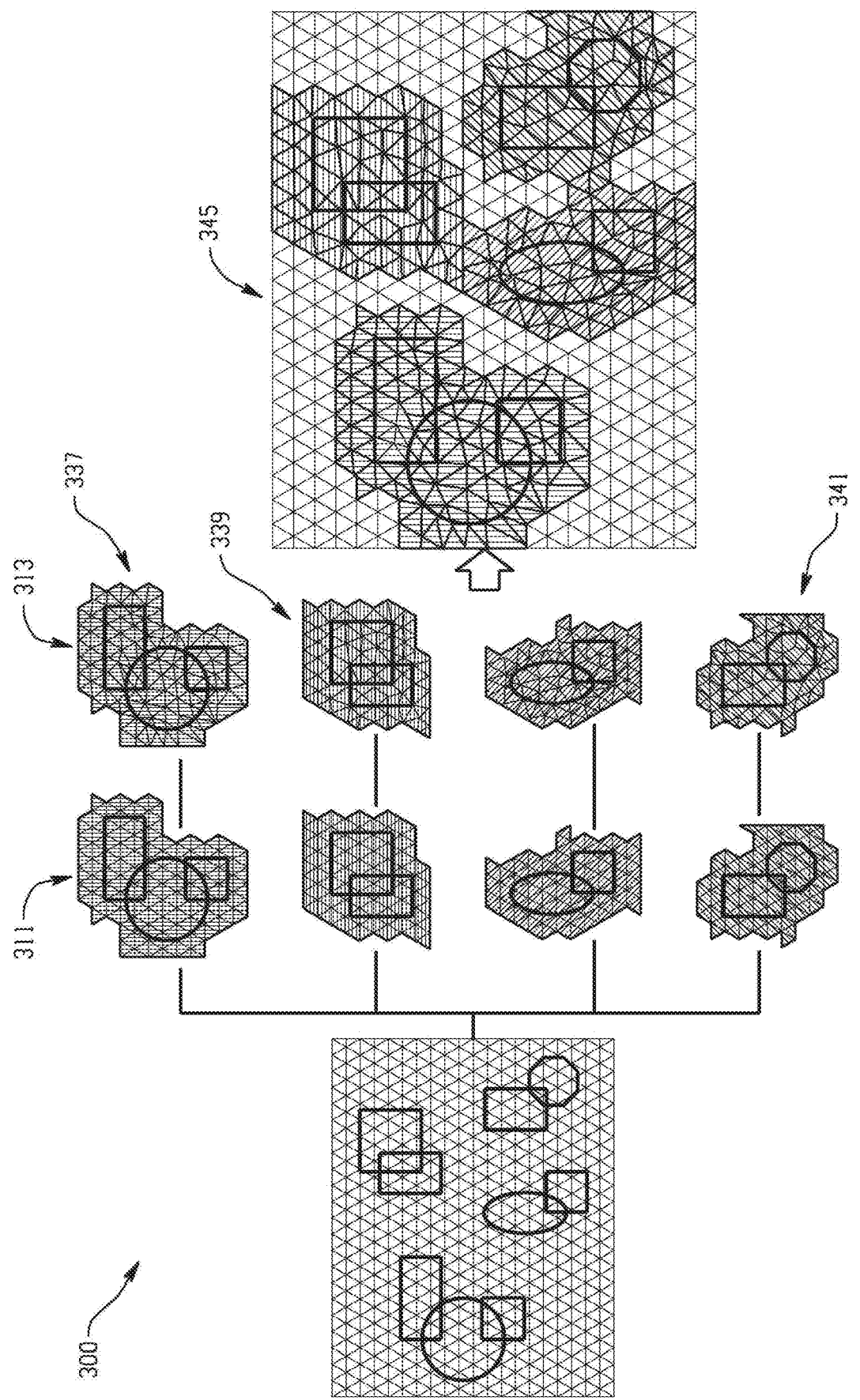

FIG. 3G shows the full decomposition process 300 according to one embodiment. After generation of multiple domains 335, each of them may be sent to a separate computer processor for mesh refinement, resulting in multiple meshed domains 313. In this example, the first domain 337 may be meshed by the first computer processor (not shown), while the second domain 339 may be meshed by the second computer processor (not shown), and so on, such that the n-th domain 341 may be meshed by the n-th computer processor (not shown). Extra mesh nodes can be inserted into the boundary 343 shared by domains, but the boundary 343 cannot be relocated. That is a so-called frozen boundary. The resulting global mesh 345 is always a conformal mesh. The global mesh 345 may be generated by any one of the "n" computer processors which refined the mesh of "n" domains, or by another computer processor, or by a combination of these processors.

Figure 4A:
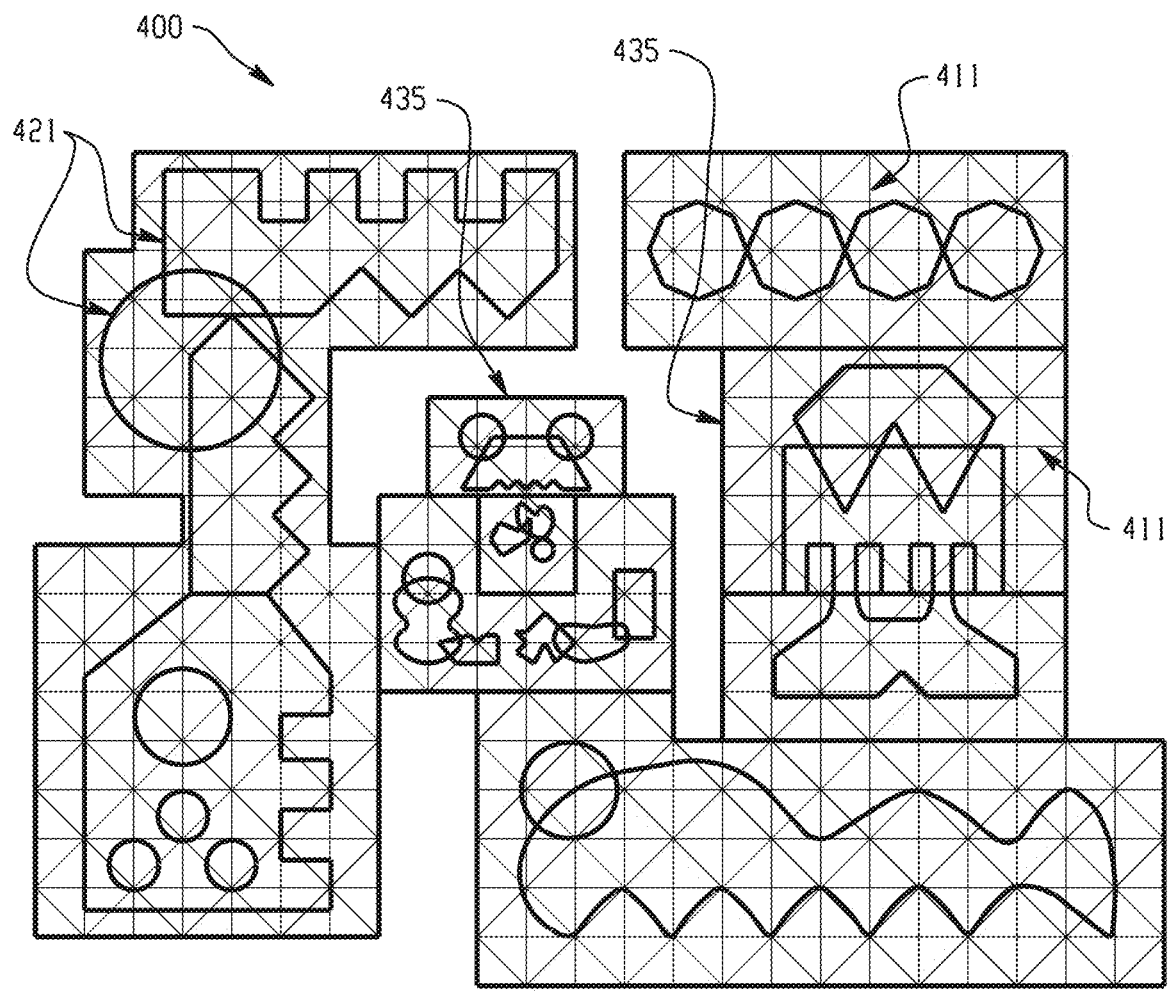
FIGS. 4A-4D are diagrams illustrating a frozen boundary method according to one embodiment.

FIGS. 4A-4D are diagrams illustrating a frozen boundary method according to one embodiment. They explain the structure and functionality of the parallel meshing with a frozen boundary. FIG. 4A shows multiple (e.g., seven) domains 435 of the model 400. Each domain 435 has one or more objects. Each domain 435 may have its own base mesh 411 and its own geometry, which may be established according to object boundaries 421 (e.g., based on clustering and/or domain decomposition mechanisms). Base mesh 411 of each of the multiple domains 435 is uniform and conformal at the domain level. Base mesh 411 may be established separately for each domain 435, or jointly for all domains. Each domain 435 has its own base mesh 411 with conformal boundary mesh to its neighboring domains. Conformal boundary mesh means that each node on the boundary between two domains is a node of at least one element in each of these two domains. In a three-dimensional mesh, it also requires that each edge on the boundary between two domains is an edge of at least one element in each of these two domains. Each domain 435 may be prepared for being meshed by a dedicated computer processor. Preparation of the domain may include identifying the computer processor for meshing that domain.

Figure 4B:
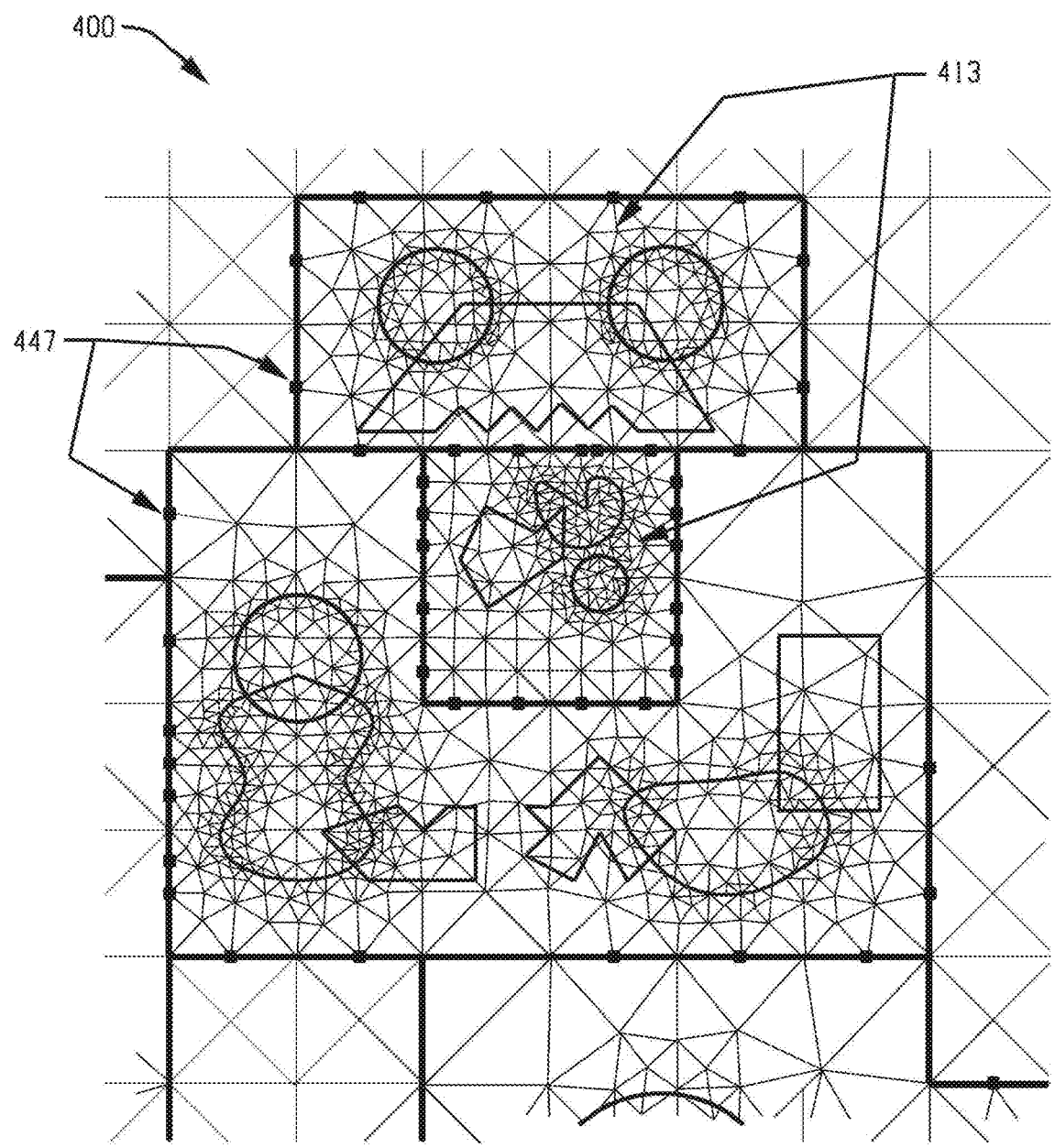

FIG. 4B illustrates the adaptive refinement within each domain in parallel. Adaptive refinement may include splitting elements of a base mesh into smaller elements in such a way that the element size is adapted to the size of the model 400 features. A separate computer processor may refine mesh for each of the domains. No data communication between the separate computer processors refining meshes for separate domains takes place during this step. In some embodiments, the resulting domain mesh 413 is conformal within each of the domains 435. However, a global mesh at this stage of the method may be non-conformal at the domain interfaces. This is different from the conventional methods where heavy data communication takes place to dynamically maintain conformal mesh in the refinement process. This is illustrated by dots 447, which may indicate points on the boundary between two domains. These points refer to hanging nodes of some elements in only one of the two domains. A hanging node is a node on the boundary between two adjacent domains that is a node of an element in one of these two adjacent domain, but is not a node of an element in the other of these two adjacent domain. For this reason, the global mesh may be non-conformal at this stage of the method. Specifically, for the element that has a node on the boundary which does not have a corresponding node on the other side of the boundary, the intersection with the adjacent element on the other side of the boundary will not be a vertex or an edge of both of these elements. Rather, for the adjacent element on the other side of the boundary, that intersection will be only a section of the edge, not the full edge, of that adjacent element. This makes the global mesh non-conformal. In this step, separate processors perform mesh refinement for different domains, respectively.

Figure 4C:
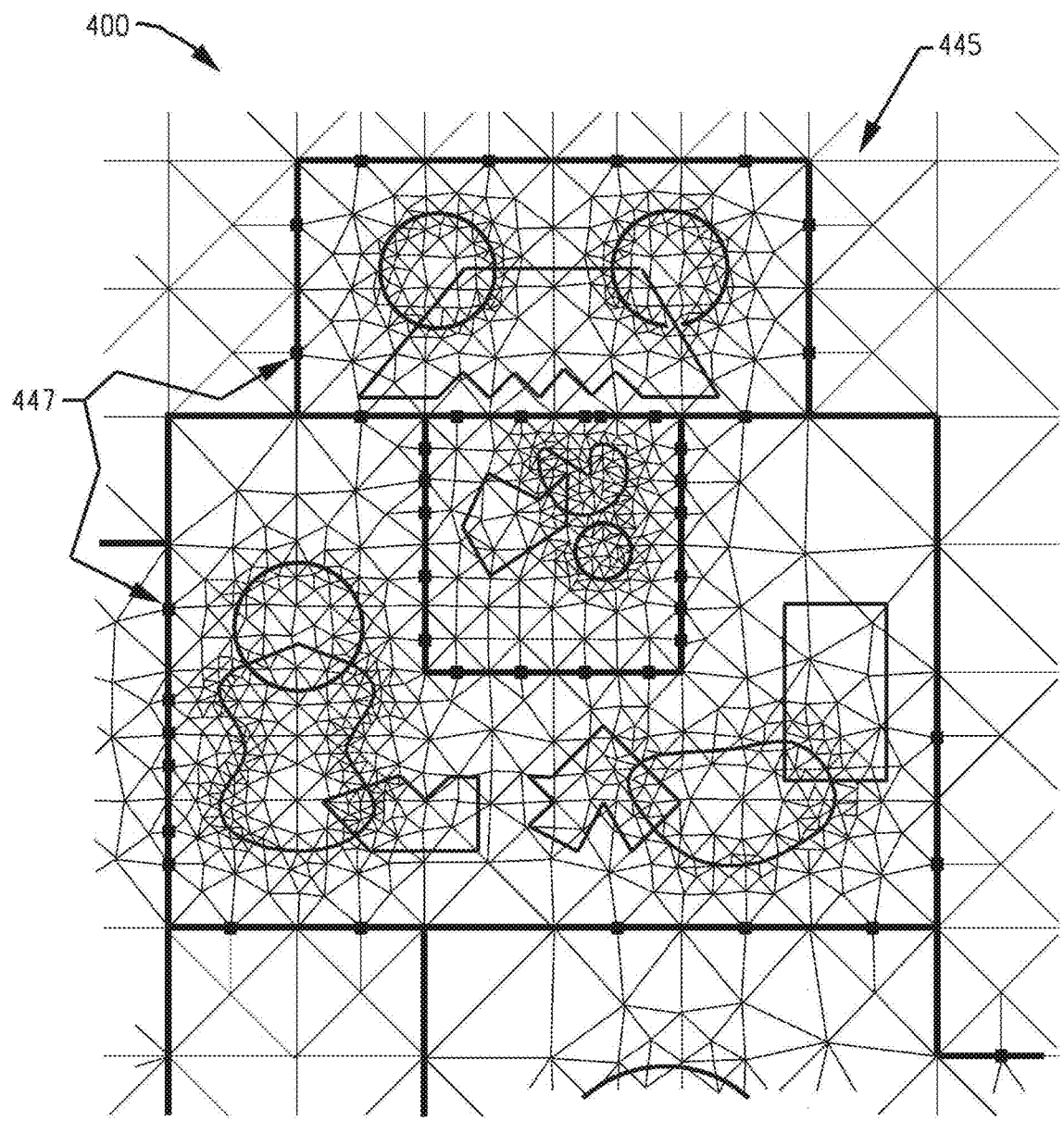

FIG. 4C shows a two-way boundary mesh mapping, which may result in a conformal mesh 445. This may be the only step for this method where data exchange between computer processors meshing separate domains may take place. This step may be performed by one or more of the processors which conducted mesh refinement of the individual domains, or by another dedicated processor. In one embodiment, separate processors for separate domains sharing a frozen boundary can communicate with each other to perform the two-way boundary mesh mapping to generate a conformal domain boundary (e.g. with additional nodes added to the frozen boundary). Alternatively or optionally, a dedicated processor (e.g. a host processor) can perform the two-way boundary mesh mapping between two separate domains (e.g. already meshed domains) sharing a frozen boundary. This step performs a two-way boundary mesh mapping to exchange additional boundary nodes between domains, so that a conformal domain boundary mesh can be achieved. In this step, additional points indicated by dots 447 may be added as nodes to each of the domains bordering or with the frozen boundary. As explained above, each dot 447 of FIG. 4C may indicate a point on the boundary that is a node for one of the two neighboring domains sharing this boundary, but not for the other of the two neighboring domains. In the mapping step, the corresponding node may be added to the other domain sharing the boundary, which did not have this point as a node prior to mapping. After the mesh refinement in each domain there is more possibility that extra nodes are inserted at some locations on the boundary from both domains. Therefore, much less data handling is needed in this step than in conventional methods which deal with the process of mesh refinement in parallel. Once this mapping process is completed, the resulting global mesh is conformal.

Figure 4D:
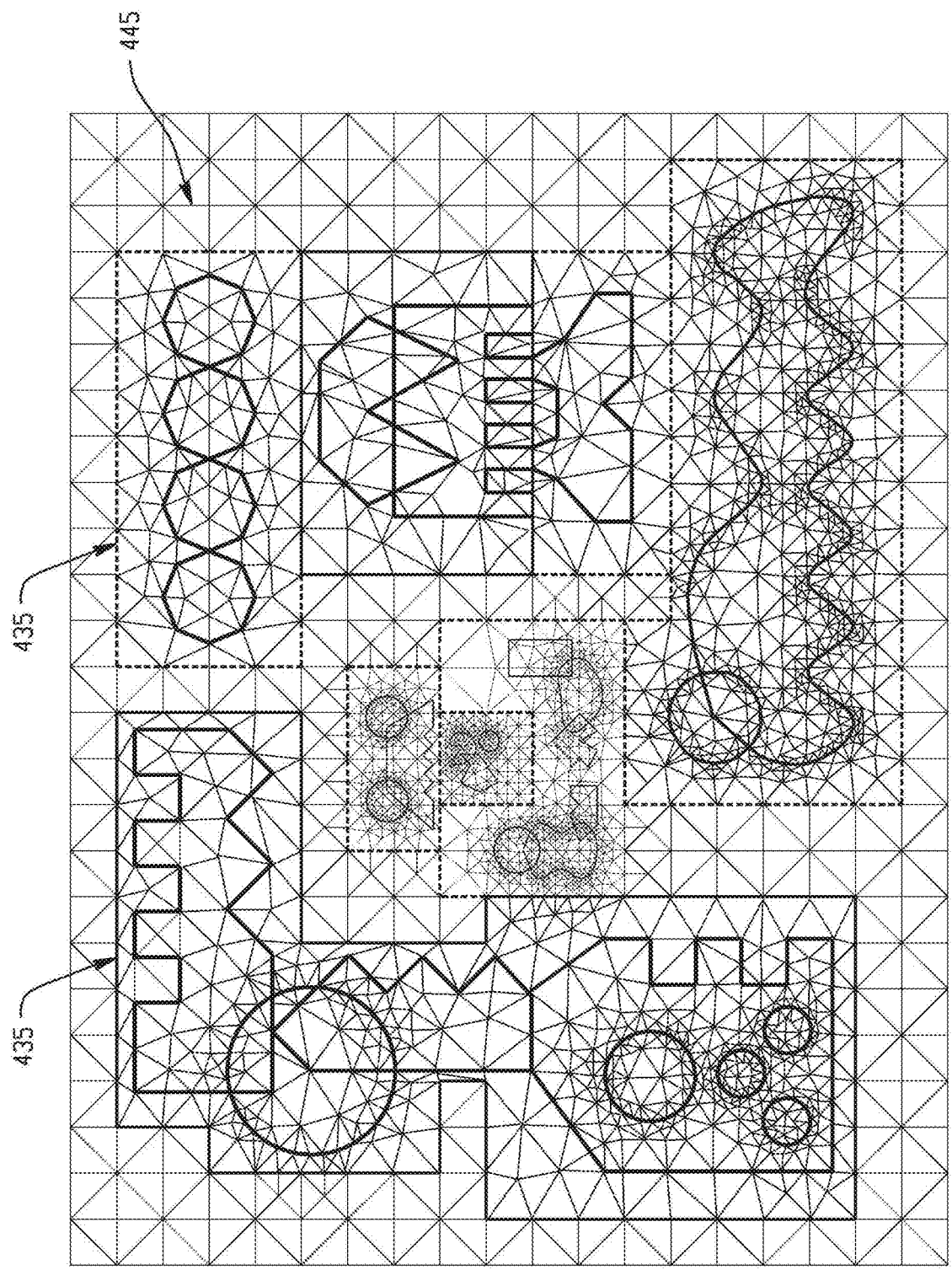

Parallel mesh generation is shown in FIG. 4D. It accommodates newly added nodes from the previous step. At this stage of the method, surface recovery and identity (Solid ID) assignment may take place in parallel for each domain 435 in the model 400. For each domain 435, this process may be conducted by separate dedicated computer processors (not shown) in parallel, without synchronization between these processors. No data communication may take place between these computer processors during this step. The domain boundary may remain frozen during this step. This means that nodes on the frozen boundary may not move, be added, or be removed during the parallel mesh generation step. In a three-dimensional mesh, this further requires the edges on the frozen boundary may not move, be split, or be merged during this parallel mesh generation step. Designating a boundary as a frozen boundary may involve setting a flag in the corresponding computer data structure to indicate the boundary as frozen. Therefore, the resulting global mesh 445 remains conformal at the end of this parallel mesh generation step.

Figure 5:
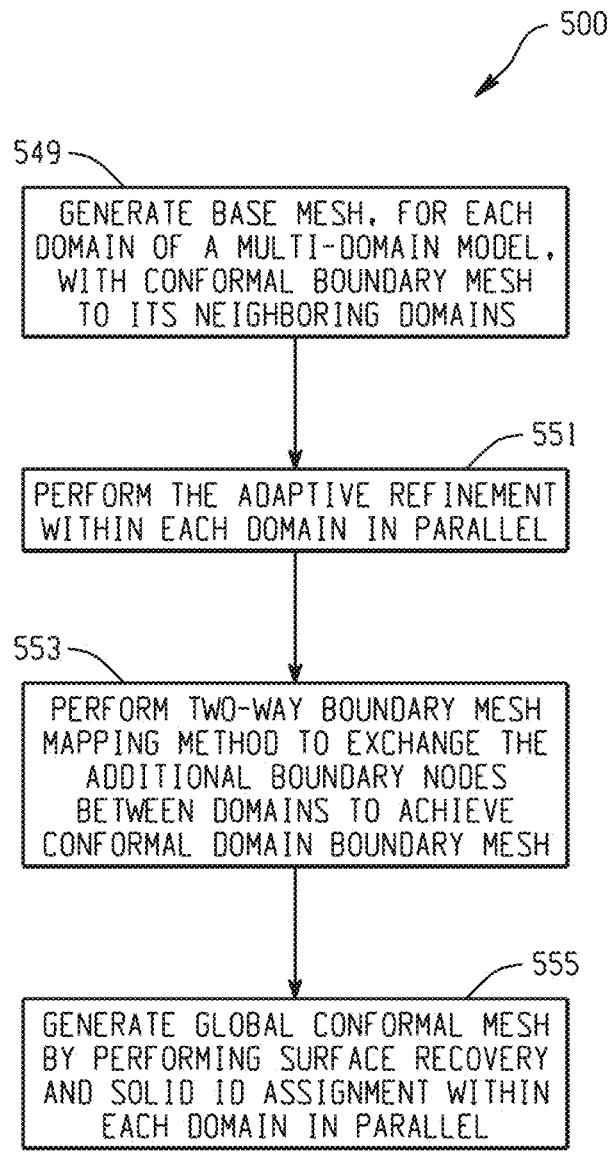
FIG. 5 is a flow diagram depicting a processor-implemented method for frozen boundary method according to one embodiment.

FIG. 5 is a flow diagram depicting a processor-implemented method 500 for frozen boundary method according to one embodiment. In the first step 549, base mesh may be created for the model. The model base mesh may include base meshes generated for each domain of a multi-domain model. Base meshes of separate domains may be generated by parallel processors. Boundaries between domains may also be meshed, resulting in a conformal boundary mesh to its neighboring domains. A central processor may control the generation of the model base mesh by sending individual domains to parallel processors for generation of base meshes of these separate domains.

In the second step 551, the adaptive refinement may be performed within each domain in parallel. To accomplish that, the central processor may send base meshes of individual domains to parallel processors. Central processor may indicate to the parallel processors that boundary nodes are frozen. In this mesh refinement step, this may mean that nodes can be added to the boundary of an individual domain as needed for refinement, but cannot be moved or deleted from the boundary of that individual domain. Each parallel processor may refine the base mesh of one or more individual domains. At this step of the method, internal geometry of the components in the domain may be not yet meshed. A refined mesh of an individual domain is conformal. No data communication occurs in this step between parallel processors. Once each parallel processor completes mesh refinement, it may send the refined mesh of the corresponding domain back to the central processor. The central processor may receive the refined meshes of all individual domains from the parallel processors and may assemble them into a refined mesh of the model. Since parallel processors refine domain meshes without communicating with each other, the refined model mesh may be non-conformal. The reason is that the boundaries between the domains may contain hanging nodes-nodes of an element on one side of the boundary which are not nodes of any element on the other side of the boundary.

In the third step 553, a two-way boundary mesh mapping may be performed to exchange the additional boundary nodes between domains to achieve global conformal mesh. According to some embodiments, this may be the only step of the method where data may be exchanged between individual domains. In this step, the central processor may add, to each refined domain mesh, additional nodes along the boundary of that domain. The additional nodes may be the nodes which were not on the boundary of that domain prior to sending the base domain mesh for mesh refinement in the previous step. For each domain, these additional nodes may correspond to the points on the boundary that are the nodes of an element in the adjacent domain across the boundary, but not the nodes of any element in the refined mesh of this domain. Addition of the nodes at the boundary in this step may alternatively be accomplished by parallel processors separately for individual domains. At the completion of this step, the refined model mesh is conformal. The reason is that all nodes on each boundary between two adjacent domains are nodes of elements on both sides of that boundary.

In the fourth step 555, a global conformal mesh may be generated by performing surface recovery and solid ID assignment within each domain in parallel. In this step, the boundaries between the domains are frozen again. That is, no nodes on the boundaries can be added, removed, or moved. The central processor may send refined meshes of individual domains to parallel processors. Each parallel processor may perform surface recovery and solid ID assignment for one or several domains. No data communication between the parallel processors may take place during this step. Each parallel processor may send the solid IDs it generated for assigned domains back to the central processor. The central processor may then combine all recovered surface and all solid IDs. The central processor may send the resulting global model mesh to a graphical display for graphical rendering.

FIGS. 6A-6B are diagrams illustrating application of a frozen boundary method to electro-magnetic modeling at various frequencies, according to one embodiment. In the process 600, a conformal global mesh 613 of the EM model 601 may be generated. Three rows of FIG. 6A may correspond to three different frequencies of the finite element analysis, resulting in three different sizes of padding around the model 601. The overall structure for meshing may include the model domain 661, which may be the same at each frequency, and a surrounding boundary domain 659, which may vary in size depending on frequency. The boundary domain may include padding, or PMLs, or both. In a frozen boundary method according to one embodiment, where the model domain 661 plays a dominant role for meshing factors, coarse mesh 611 of the model domain may be first prepared. Then coarse meshes 611 may be refined to obtain refined meshes 613 of the model domain. In this example, each model domain mesh 613 contains 627 triangular elements in all three cases. The border between the model domain 661 and the surrounding boundary domain 659 may be a frozen boundary 643. This border may constitute an internal boundary of the surrounding boundary domain. This may result in a good quality, consistent model domain mesh 613.

FIG. 6B shows further steps of the frozen boundary method according to one embodiment. A refined mesh 613 of the model domain 661, surrounded by a frozen boundary 643, may be integrated with the mesh 663 of the surrounding boundary domain 659. As a result, global mesh 645 may be a high quality conformal mesh, with consistent model mesh quality at any frequency.

FIG. 7 is a diagram illustrating application of a frozen boundary method to electro-magnetic modeling at various frequencies, according to one embodiment. In this method 700, an EM model 701 may be represented by model domain 761. Coarse base mesh 710 of the model domain 761 may be refined to obtain a refined mesh 713. At each frequency, refined mesh 713 of the domain 761 may be combined with a mesh 763 of the boundary domain. Now each model domain mesh 713 may have the identical mesh quality and elements regardless of frequency. This approach may allow boundary domain to be isolated, and may have no impact on model domain meshing process. Model domain mesh may be consistent between frequencies, and may not depend on what padding is used and how it is added to the model.

Figure 8A:
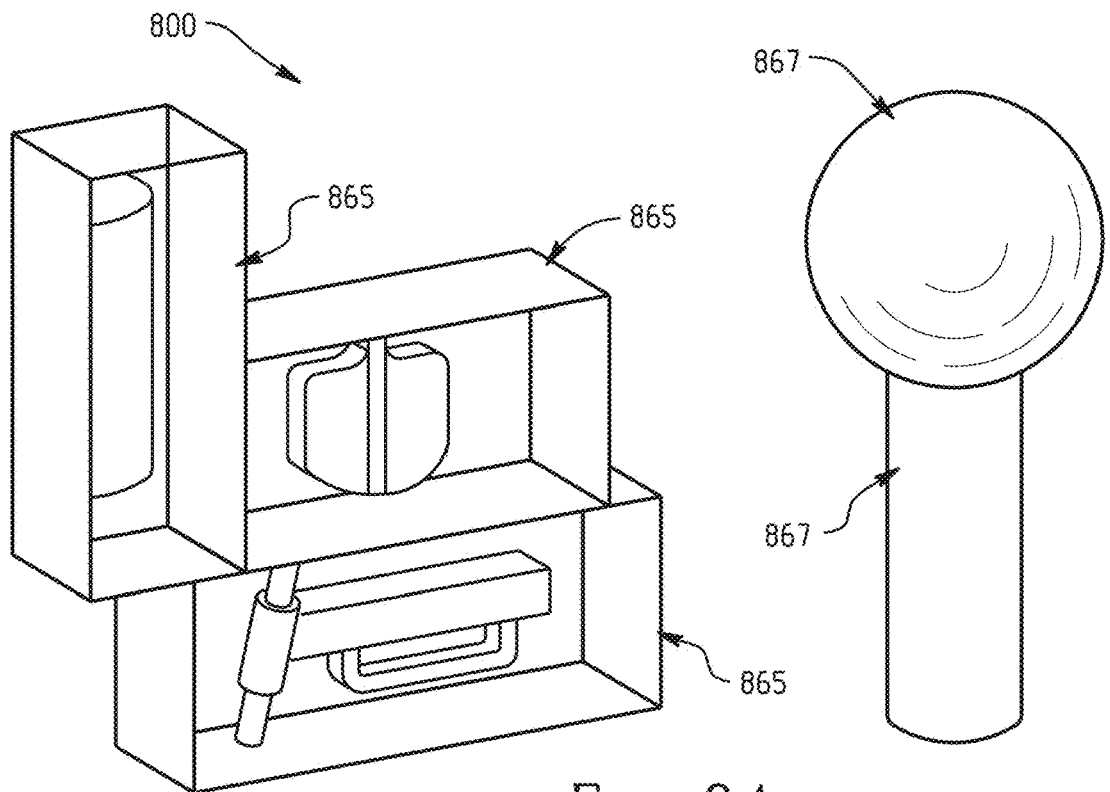
FIGS. 8A-8C are diagrams illustrating application of a frozen boundary method to bound domains, according to one embodiment.
Figure 8B:
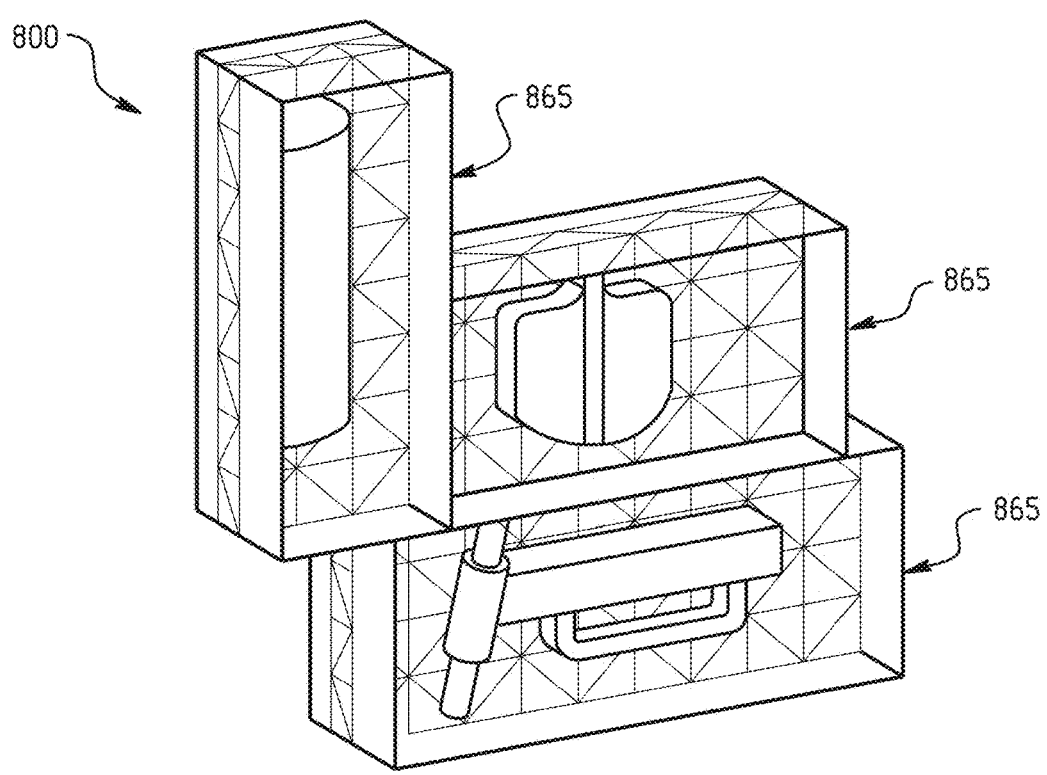
Figure 8C:
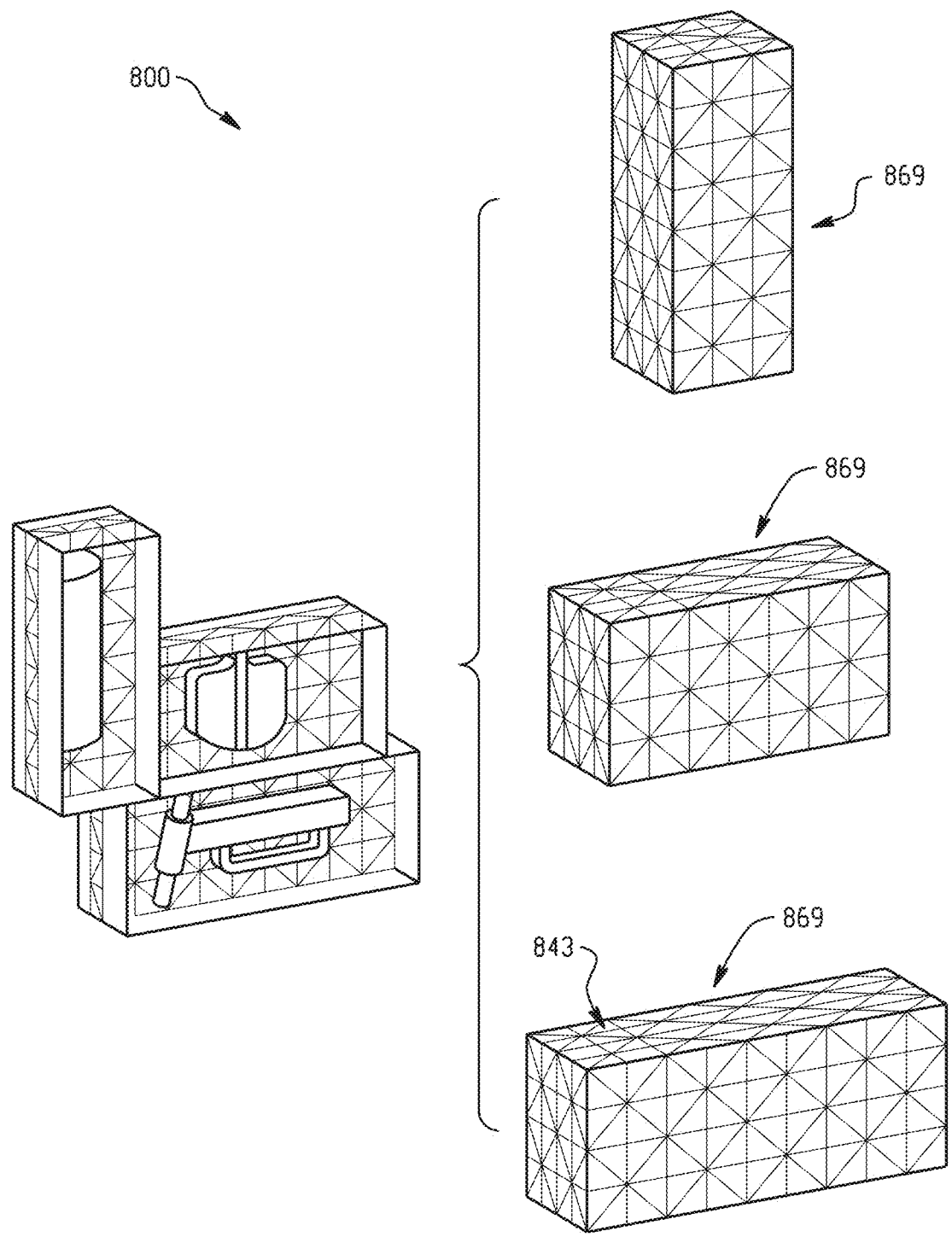

FIGS. 8A-8C are diagrams 800 illustrating application of a frozen boundary method to bound domains, according to one embodiment. A bound domain is defined as a set of objects enclosed by a box. FIG. 8A shows three bound domains 865 in the model. In the other example, two domains 867 may be defined as component domains. FIG. 8B is a close-up view of one example of bound domains. In this example, there are three bound domains 865. FIG. 8C illustrates preparation of bound domain meshes 869. At this stage, the domain meshes may be ready for frozen boundary parallel mesh generation. Six sides of boundary 843 are the example of a frozen boundary. In this embodiment, the model is a three-dimensional model, and therefore the frozen boundary between the domains is a two-dimensional surface.

Figure 9:
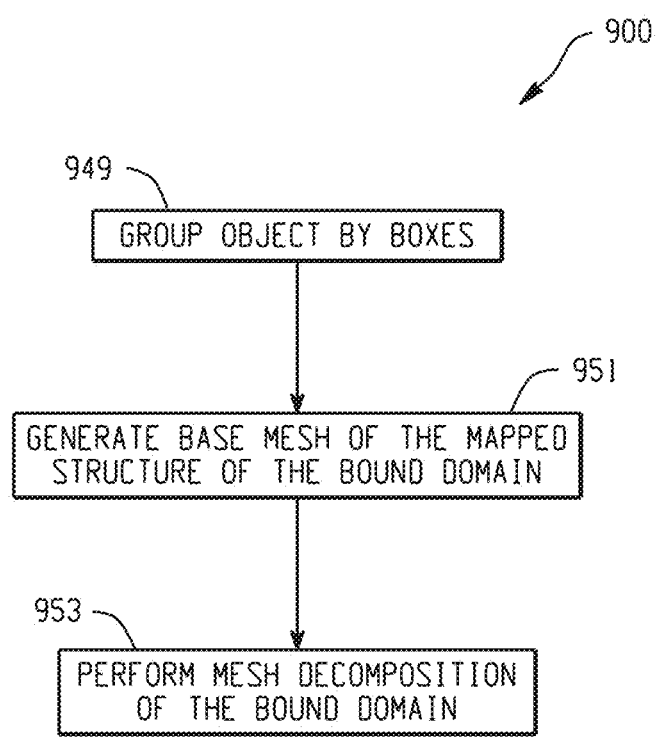
FIG. 9 is a flow diagram depicting a processor-implemented method for application of a frozen boundary method to bound domains, according to one embodiment.

FIG. 9 is a flow diagram depicting a processor-implemented method for application of a frozen boundary method to bound domains, according to one embodiment. In the first step 949, objects may be grouped by boxes. In this step, objects of each bound domain are enclosed by its respective box. In the second step 951, base mesh of each bound domain may be generated. In some embodiments, a base mesh of the global model may be mapped to the bound domains. Mapping may include identifying elements and nodes of the global base mesh that are elements and nodes of the bound domains. In the third step 953, mesh decomposition of the bound domains may be performed. In this step, mesh of the bound domains may be decomposed into two, three, or more bound domain meshes. Decomposition may include separating elements and nodes of the bound domain mesh into non-overlapping sets of elements and nodes, and then assigning each set of elements and nodes to a separate bound domain mesh. After the completion of this step, the separate bound domain meshes may be used as individual domain meshes in the frozen boundary method embodiments described above.

Figure 10A:
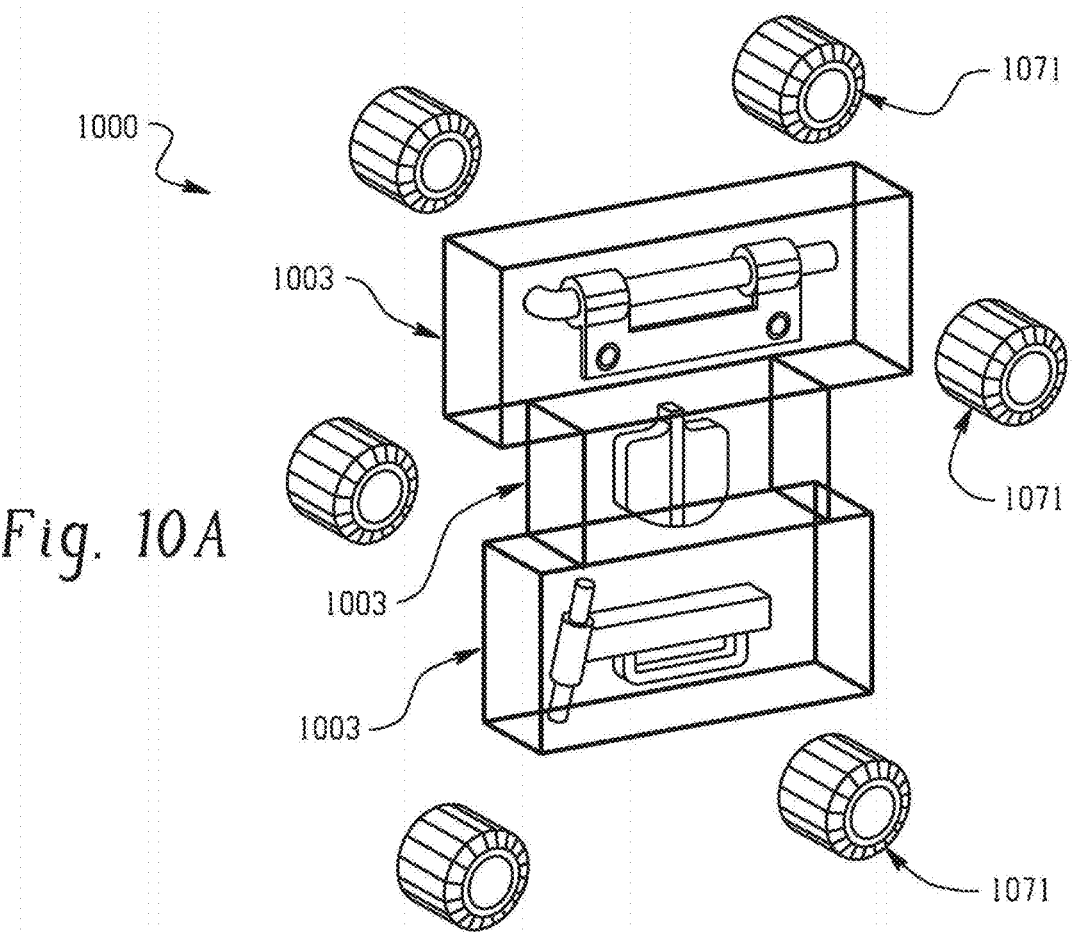
FIGS. 10A-10E are diagrams illustrating application of a frozen boundary method to island components, according to one embodiment.
Figure 10B:
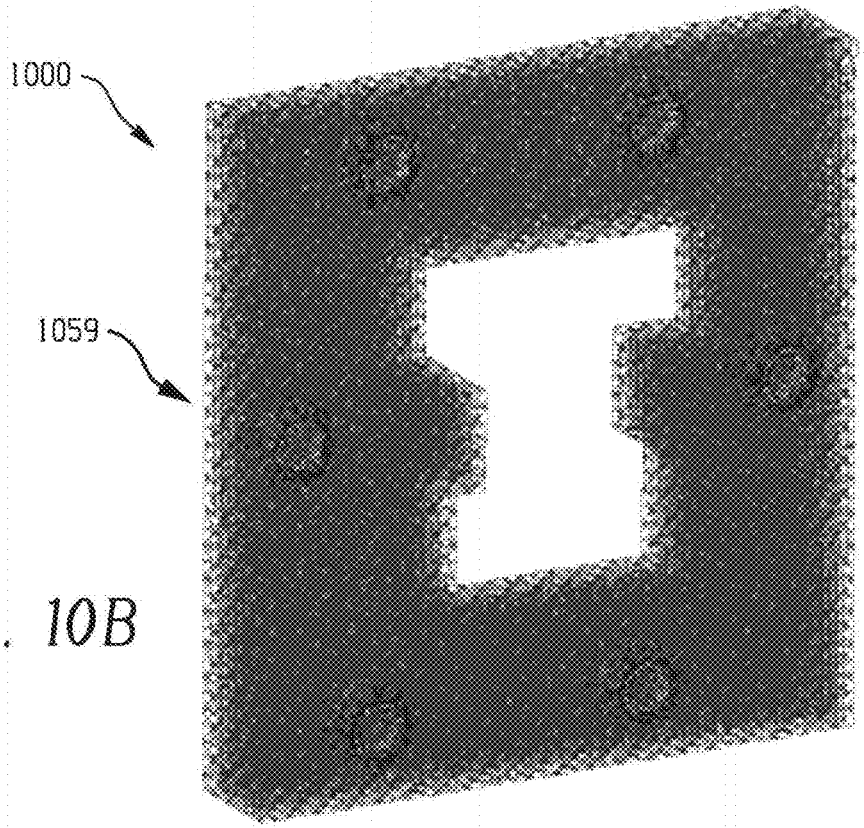
Figure 10C:
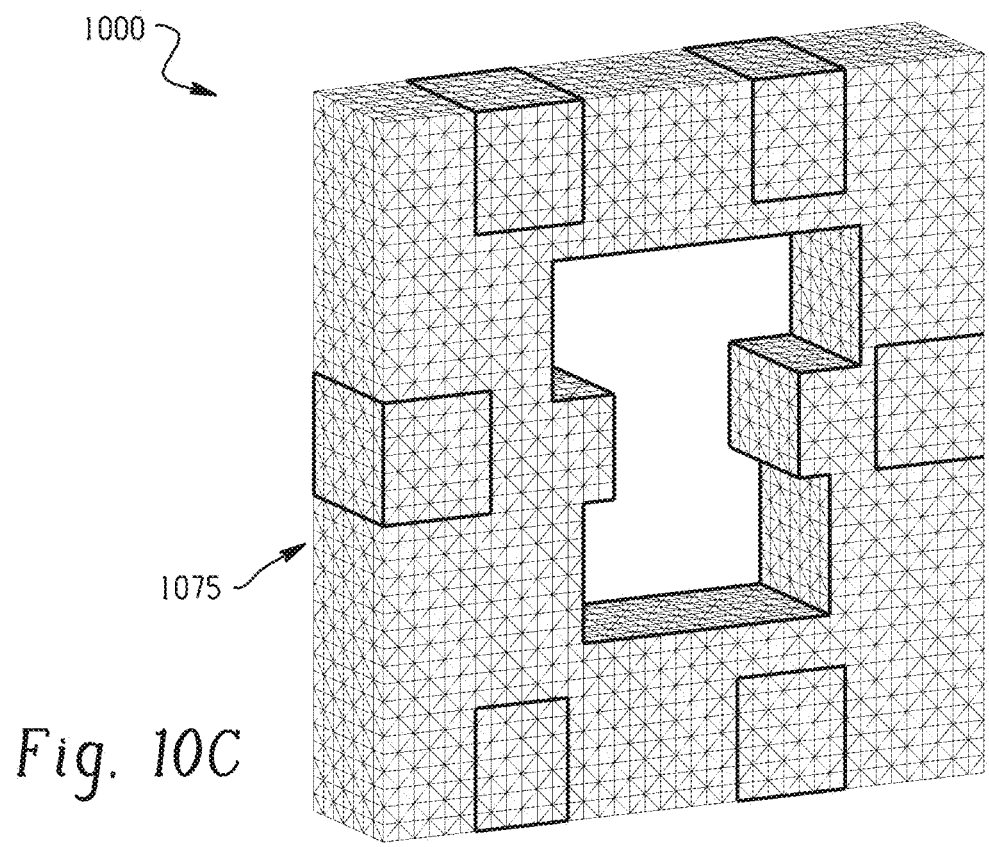
Figure 10D:
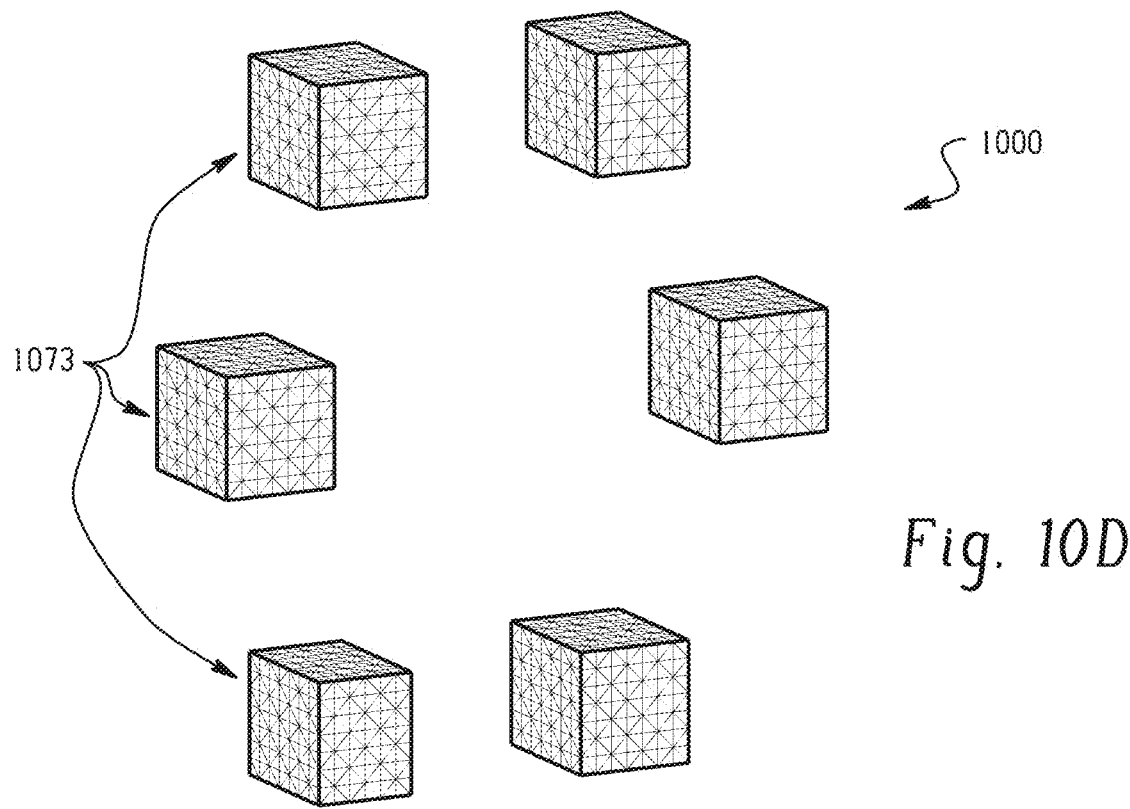
Figure 10E:
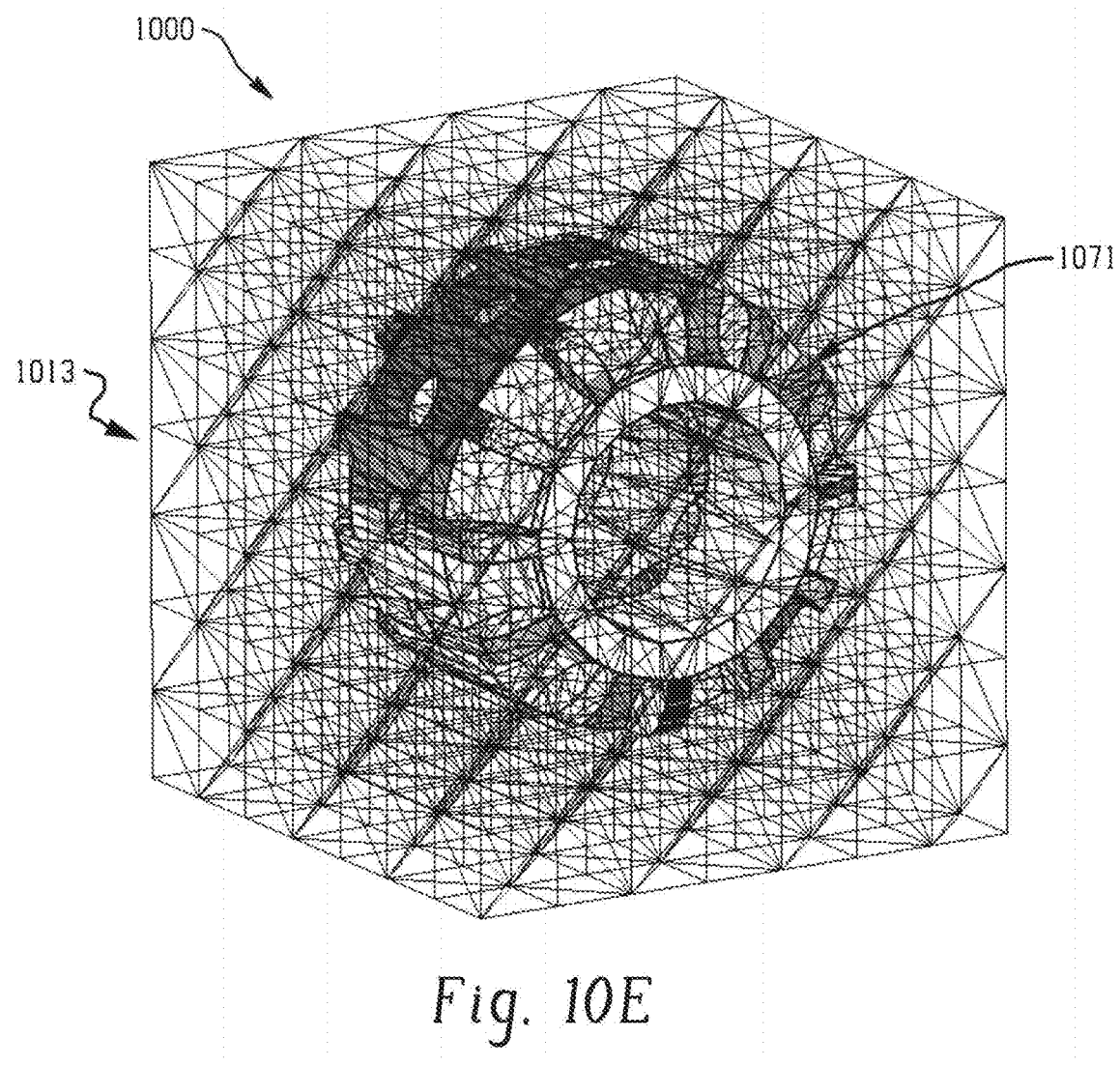

FIGS. 10A-10E are diagrams illustrating application of a frozen boundary method to island components, according to one embodiment. Island component is a component whose domain mesh is completely separated from other domain's mesh. FIG. 10A shows an example of an EM model which may include one or more bound domains 1003 which are defined above and one or more island components 1071. The EM model 1000 of FIG. 10A may be surrounded by a surrounding domain 1059, as shown in FIG. 10B. Overlapping base mesh 1075 of the surrounding domain 1059 and island components 1071 are shown in FIG. 10C. The overlapping base meshes 1073 of the island components alone are specified and shown in FIG. 10D. Base meshes 1073 may be ready for the application of the frozen boundary method as described above. A resulting refined mesh 1013 of the island component 1071 is shown in FIG. 10E.

Figure 11:
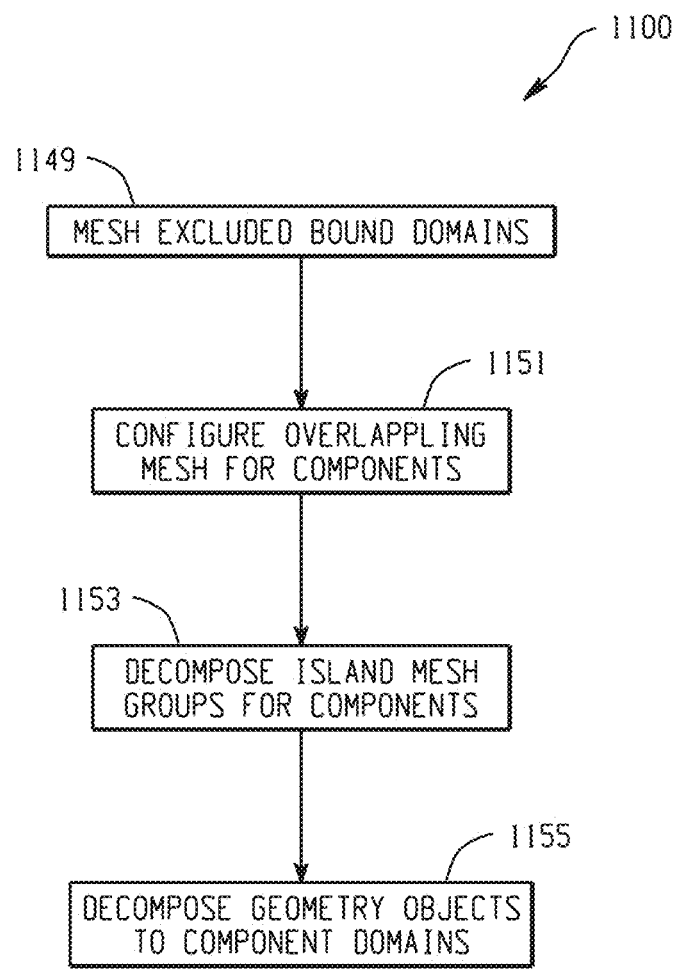
FIG. 11 is a flow diagram depicting a processor-implemented method for application of a frozen boundary method to island components, according to one embodiment.

FIG. 11 is a flow diagram 1100 depicting a processor-implemented method for application of a frozen boundary method to island components, according to one embodiment. In the first step 1149, meshes inside bound domains are excluded. In the second step 1151, overlapping base mesh over components may be configured. Configuring may include assigning selected elements and nodes of a base mesh to corresponding components of the model. In the third step 1153, island mesh groups (a set of island components) may be decomposed for each component. In this step, mesh of the island mesh groups may be decomposed into separate domain meshes for the corresponding components of the model. Decomposition may include separating elements and nodes of the island mesh groups into non-overlapping sets of elements and nodes, and then assigning sets of elements and nodes to separate components of the model. In the fourth step 1155, geometry objects may be decomposed to corresponding component domains by a domain decomposition process. Decomposition of geometry objects may include separating geometry objects into non-overlapping sets of geometry objects, and then assigning sets of geometry objects to separate component domains. After the completion of this step, the island mesh group and the excluded bound domain may be used as individual domains in the frozen boundary method embodiments described above.

Figure 12A:
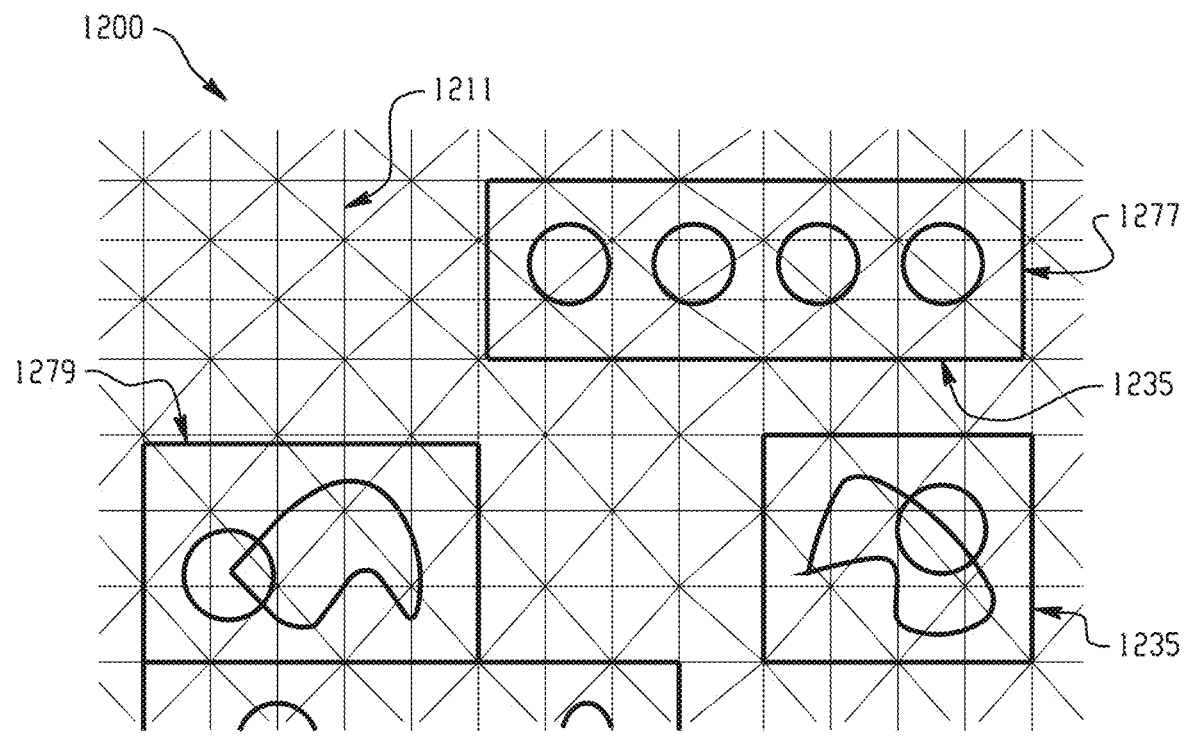
FIGS. 12A-12B are diagrams illustrating application of a frozen boundary method to misaligned domains, according to one embodiment.
Figure 12B:
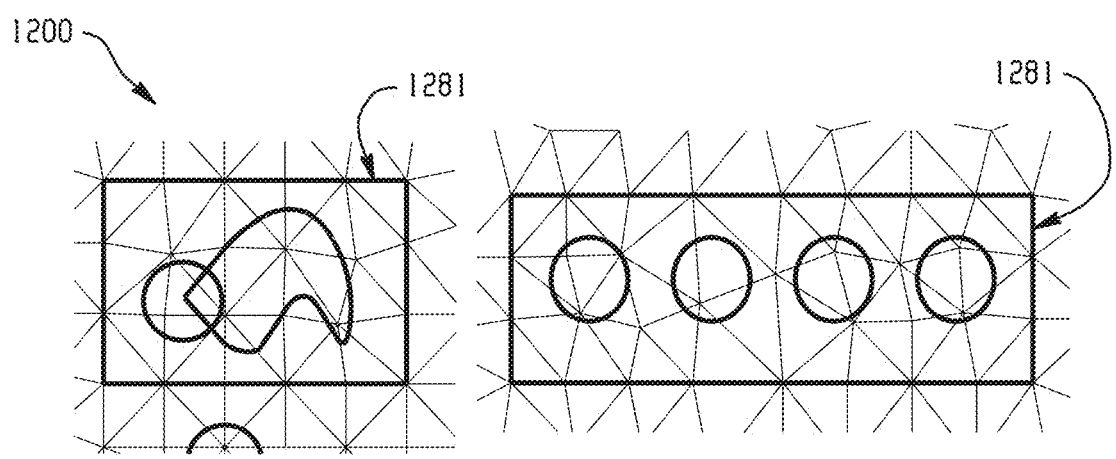

FIGS. 12A-12B are diagrams illustrating application of a frozen boundary method to misaligned bound domains, according to one embodiment. Bound domains have the same meaning as discussed above. FIG. 12A shows coarse base mesh 1211 overlapping one or more bound domains 1235. In this example, one of the bound domains has an X-direction misalignment 1277 with the elements of the base mesh 1211. Another domain in this example has a Y-direction misalignment 1279 with the base mesh 1211. Domains with misalignment may be not suitable for the application of the frozen boundary parallel mesh generation. Therefore, base mesh 1211 may need to shrink to align with bound domains. Shrinking the base mesh means that elements overlapping domains boundaries may be adjusted in size such that element edges do not cross any domain boundary. Shrinking the base mesh may cause the misalignment between the base mesh and the misaligned domain to be corrected. FIG. 12B shows the same domains that were shown misaligned in FIG. 12A, now aligned in the areas 1281. The base mesh may be now suitable for frozen boundary parallel mesh generation.

Figure 13A:
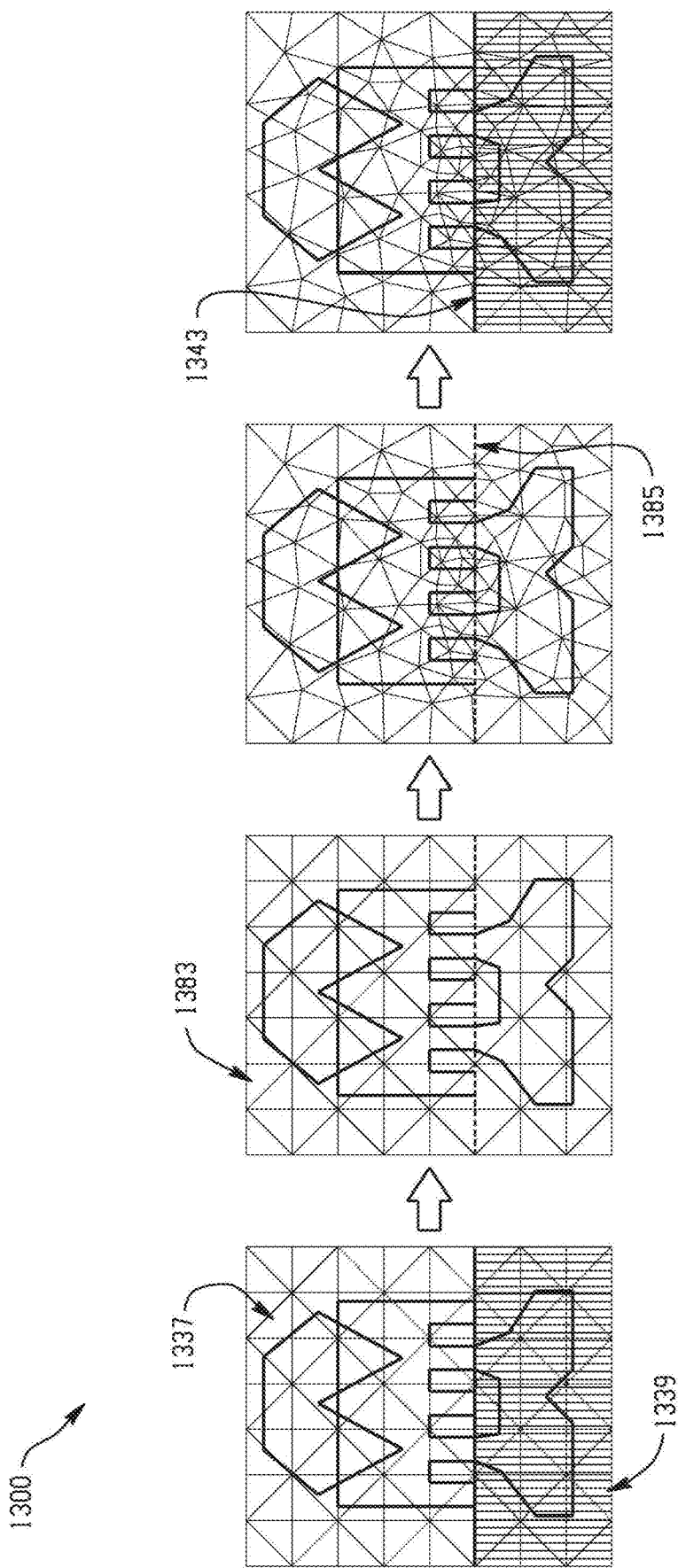
FIGS. 13A-13B are diagrams illustrating application of a frozen boundary method to domains with geometric features aligned on contact interfaces, according to one embodiment.
Figure 13B:
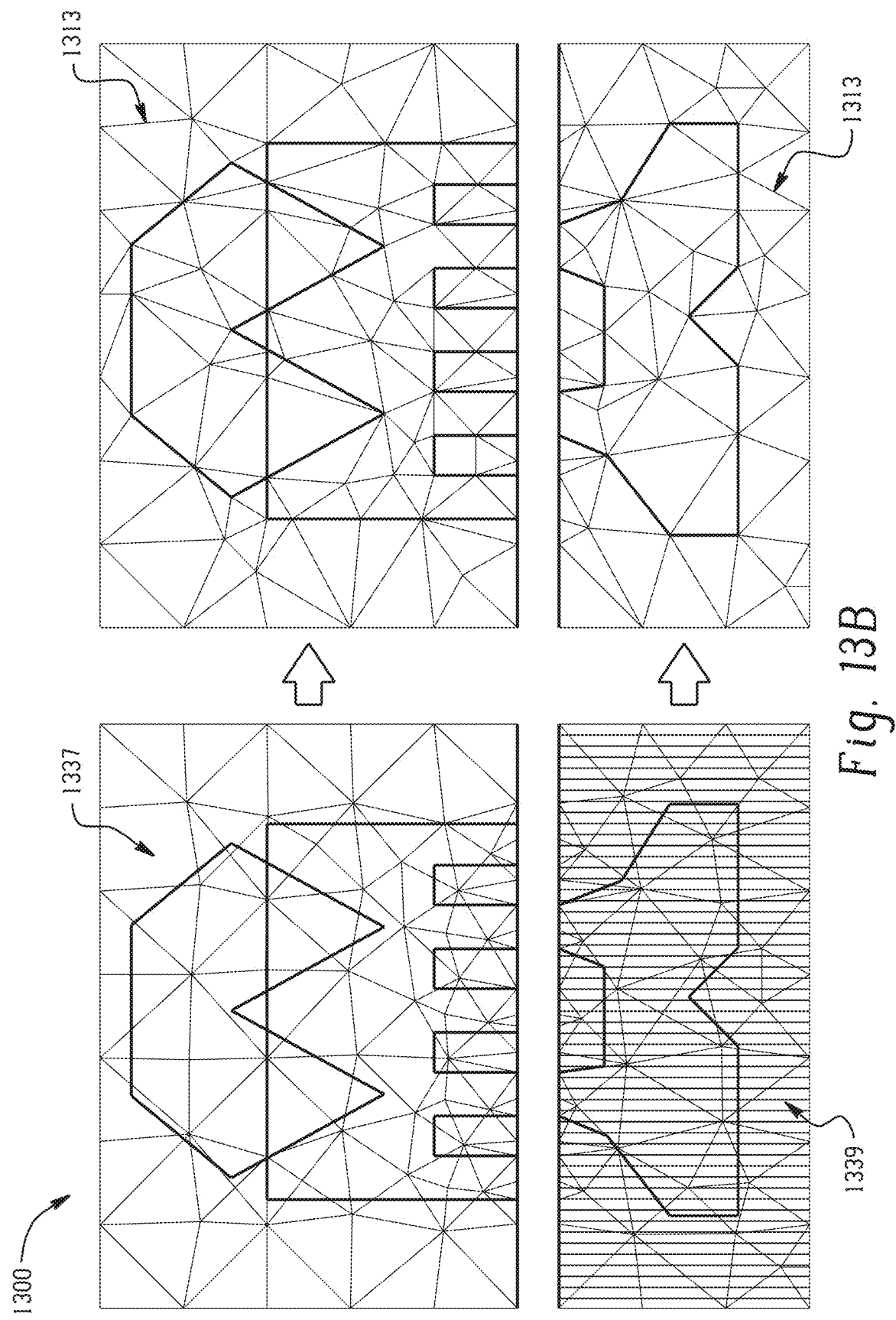

FIGS. 13A-13B are diagrams illustrating application of a frozen boundary method to domains with aligned geometry features on the domain boundary interface, according to one embodiment. FIG. 13A shows a step-by-step process 1300 of preparing domains with aligned geometry features for the application of the frozen boundary parallel mesh method. In this example, domains 1337 and 1339 have geometric features aligned on shared domain boundary. Geometric features may be features of the underlying objects of the domain.

For such a model, it is important to have a clean and meshed interface between domains before domain boundary can be frozen. In one embodiment, domains 1337 and 1339 (shown in FIG. 13B) will find their neighboring domain at the boundary if geometry features are aligned. Then these two domains may be combined into a single domain 1383. The geometry features on the shared domain boundary will be meshed, such that a clean frozen boundary mesh 1385 may be created, while the other part of the geometry is not meshed. This boundary mesh 1385 (e.g., a mesh of a boundary line) may be designated as a frozen boundary 1343. Next steps of process 1300 are shown in FIG. 13B. Single domain 1383 may be split along the frozen boundary 1343 back into previously defined domains 1337 and 1339. Using the frozen boundary parallel mesh generation method as described above, each of the domains 1337 and 1339 may be meshed in parallel. Now the global mesh of these two domains 1313 is conformal, although geometry features are aligned on both domain boundary interface.

Figure 14:
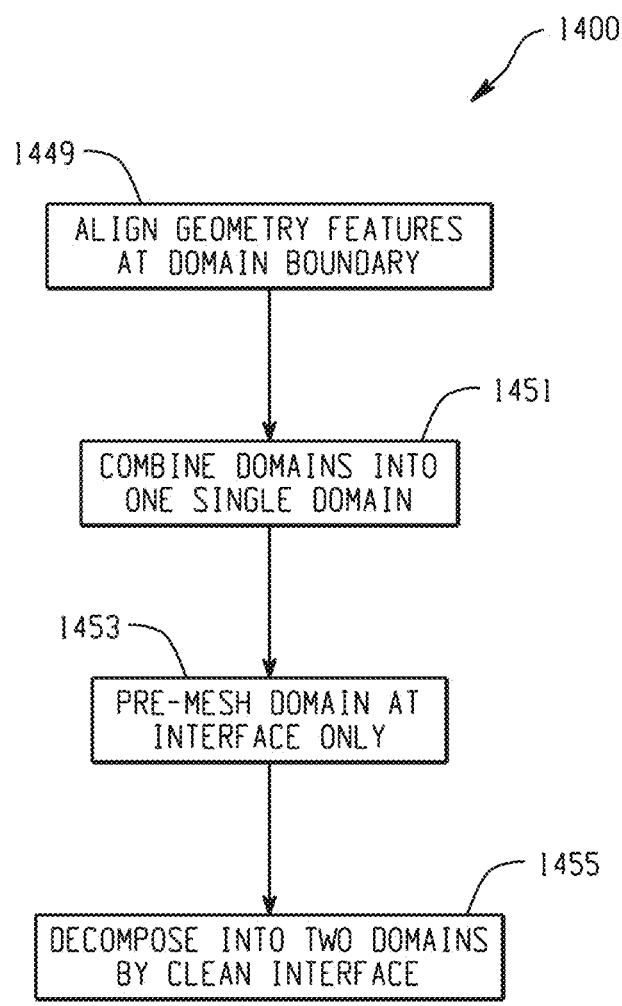
FIG. 14 is a flow diagram depicting a processor-implemented method for application of a frozen boundary method to domains with geometric features aligned on contact interfaces, according to one embodiment.

FIG. 14 is a flow diagram depicting a processor-implemented method for application of a frozen boundary method to domains with aligned geometry features, according to one embodiment. In the first step 1449, geometry features aligned at domain boundary may be identified. In the second step 1451, domains sharing the boundary with aligned geometry features may be combined into one single domain. In the third step 1453, the computer processor will only mesh these aligned geometry features on the boundary since they are located completely inside the domain and the boundary of this combined domain is frozen. In the fourth step 1455, the single domain may be decomposed into previously defined two domains again with a pre-meshed interface.

FIGS. 15A-15B are diagrams illustrating application of a frozen boundary method to sets of objects, according to one embodiment. One special case especially suitable for the application of the frozen boundary parallel mesh generation method is a domain with two sets of objects that have tight and clean contact interface. Tight contact interface means that there are no gaps along the boundary between the two sets. Clean contact interface means that no object of one set overlaps an object of another set. FIG. 15A shows a corresponding process 1500. Component domain 1535 may have two sets (1587 and 1589) of objects 1505. Sets 1587 and 1589 may have a tight and clean contact interface 1585. A refined mesh 1511 of both sets may be generated. Contact interface 1585 may be meshed only so that a boundary mesh 1585 is created to separate two sets of components. Boundary mesh 1585 may become part of the boundary domain to decompose component domain 1511 into two separate domains 1537 and 1539. Next steps of the process 1500 are shown in FIG. 15B. Domains 1537 and 1539 may now be prepared for the application of the frozen boundary parallel mesh method. Frozen boundary 1543 may be created for each of the domains 1537 and 1539. Each domain can now be sent for mesh refinement to a separate computer processor (not shown), according to the previously described frozen boundary parallel mesh method.

FIG. 16 is a flow diagram 1600 depicting a processor-implemented method for application of a frozen boundary method to component sets, according to one embodiment. In the first step 1649, one domain with a set of objects may be selected. Selection may include identifying objects that belong to the domain and creating a flag in the computer data structure for each of the objects in the domain. In the second step 1651, the domain with a set of objects may be divided into two sets of objects at the central region if they have tight contact. This step may involve domain decomposition as discussed above. In the third step 1653, domain interface may be identified. This step may be a separate step or an inherent part of the previous domain division step. In the fourth step 1655, domain interface may be meshed. In the fifth step 1657, component domain may be decomposed into two component domains by the pre-meshed domain interface.

Figure 17A:
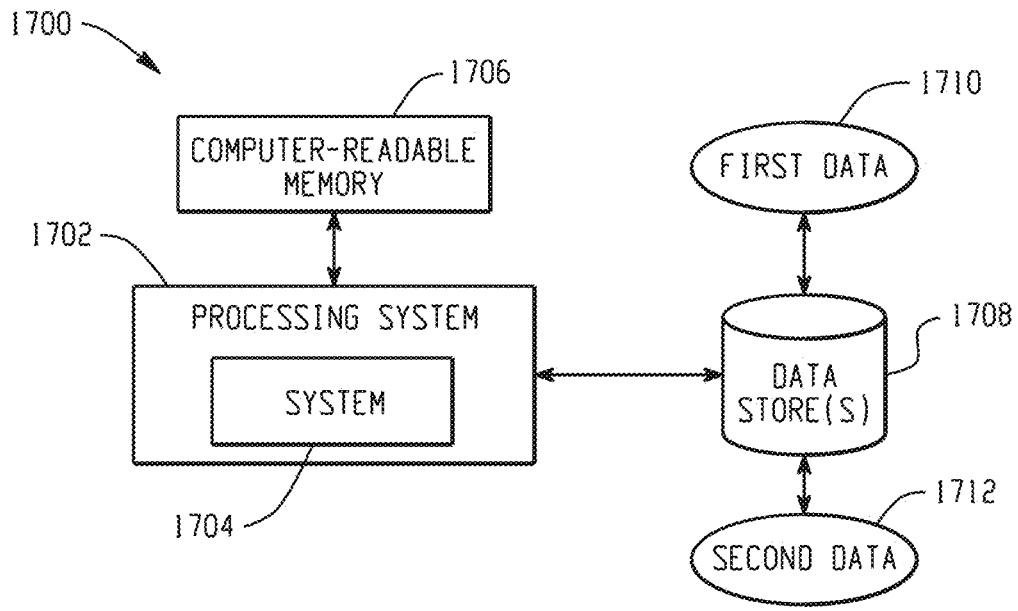
FIGS. 17A-17C and 18 depict example systems that may be used to implement the technology disclosed herein.
Figure 17B:
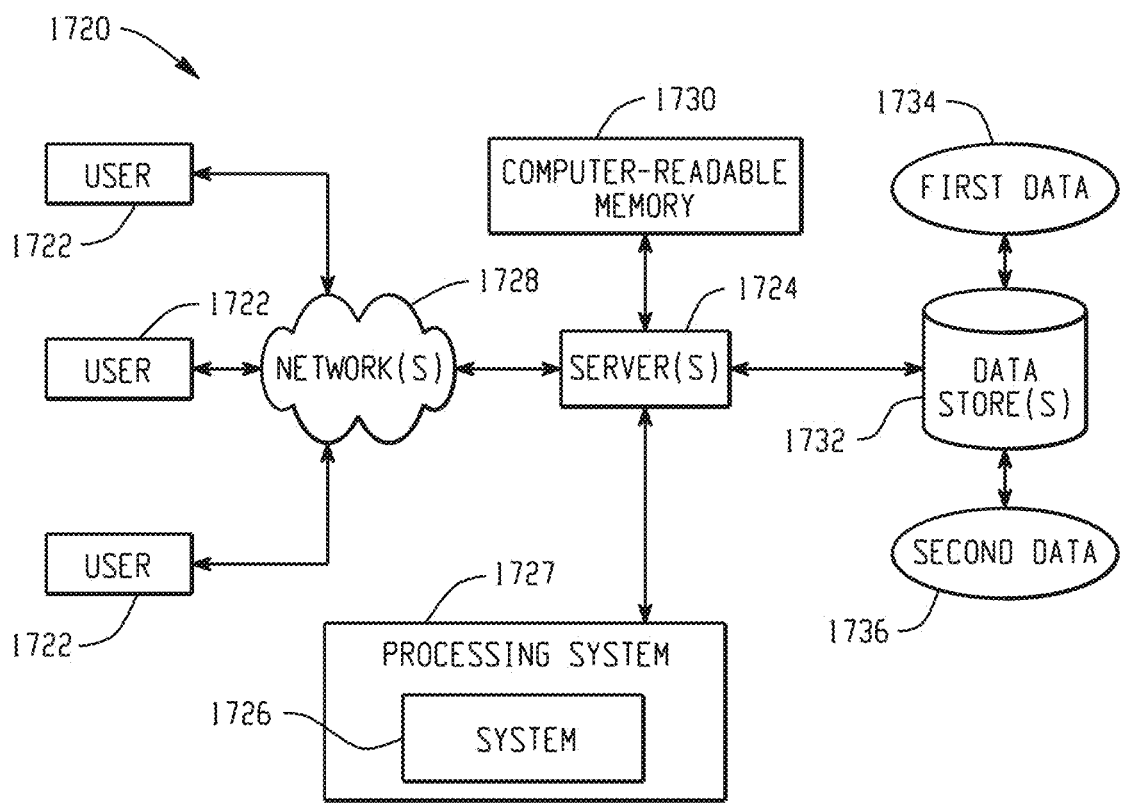
Figure 17C:
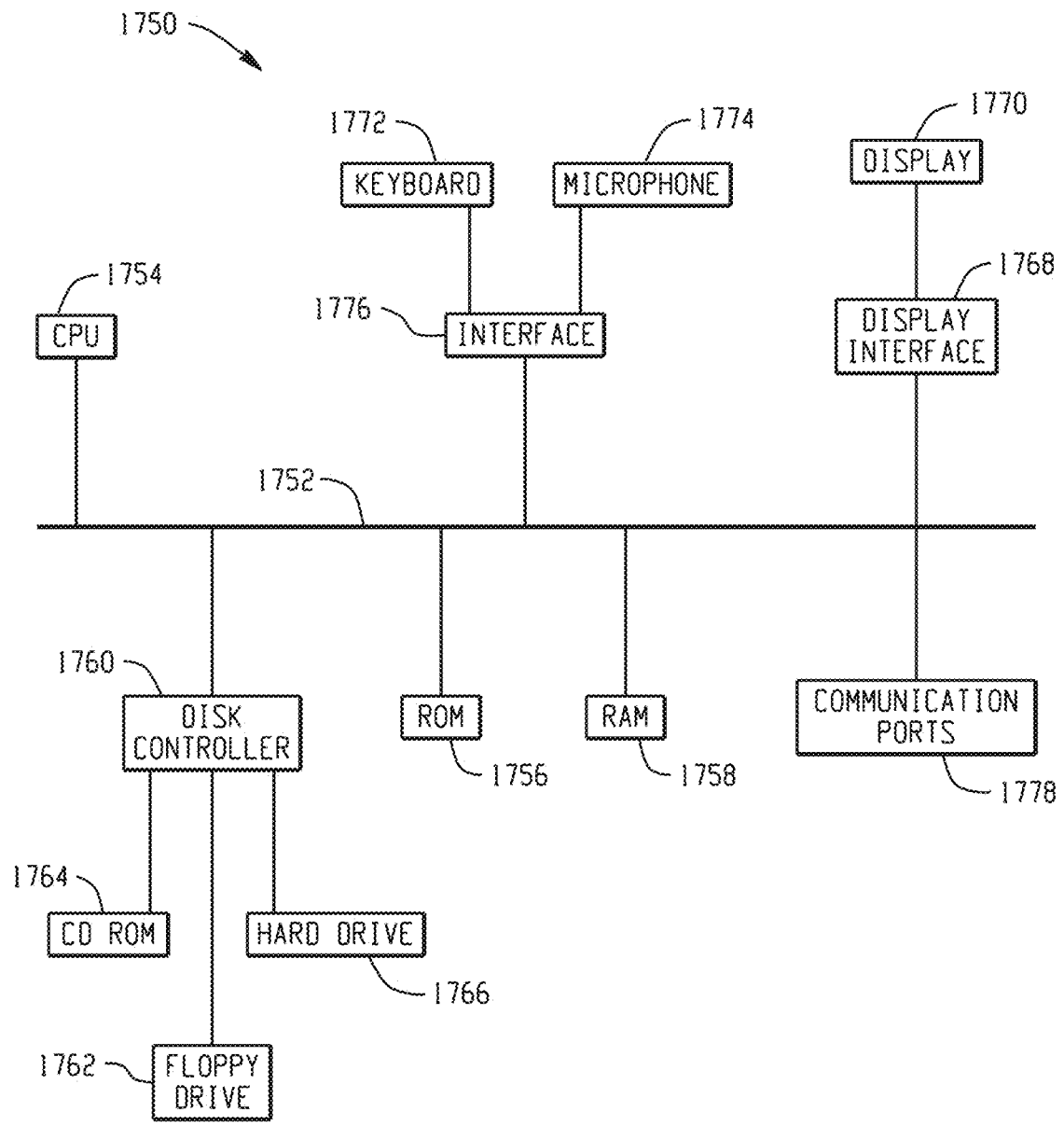

FIGS. 17A, 17B, and 17C depict example systems for use in implementing a system. For example, FIG. 17A depicts an exemplary system 1700 that includes a standalone computer architecture where a processing system 1702 (e.g., one or more computer processors) includes a system 1704 being executed on it. The processing system 1702 has access to a non-transitory computer-readable memory 1706 in addition to one or more data stores 1708. The one or more data stores 1708 may contain first data 1710 as well as second data 1712.

FIG. 17B depicts a system 1720 that includes a client server architecture. One or more user PCs 1722 accesses one or more servers 1724 running a system 1726 on a processing system 1727 via one or more networks 1728. The one or more servers 1724 may access a non-transitory computer readable memory 1730 as well as one or more data stores 1732. The one or more data stores 1732 may contain first data 1734 as well as second data 1736.

FIG. 17C shows a block diagram of exemplary hardware for a standalone computer architecture 1750, such as the architecture depicted in FIG. 17A, that may be used to contain and/or implement the program instructions of system embodiments of the present disclosure. A bus 1752 may serve as the information highway interconnecting the other illustrated components of the hardware. A processing system 1754 labeled CPU (central processing unit) (e.g., one or more computer processors), may perform calculations and logic operations required to execute a program. A non-transitory computer-readable storage medium, such as read only memory (ROM) 1756 and random access memory (RAM) 1758, may be in communication with the processing system 1754 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 1760 interfaces one or more disk drives to the system bus 1752. These disk drives may be external or internal floppy disk drives such as 1762, external or internal CD-ROM, CD-R, CD-RW or DVD drives such as 1764, or external or internal hard drives 1766.

Each of the element managers, real-time data buffer, conveyors, file input processor, database index shared access memory loader, reference data buffer and data managers may include a software application stored in one or more of the disk drives connected to the disk controller 1760, the ROM 1756 and/or the RAM 1758. Preferably, the processor 1754 may access each component as required.

A display interface 1768 may permit information from the bus 1752 to be displayed on a display 1770 in audio, graphic, or alphanumeric formal. Communication with external devices may occur using various communication ports 1778.

In addition to the standard computer-type components, the hardware may also include data input devices, such as a keyboard 1772, or other input device 1774, such as a microphone, remote control, pointer, mouse and/or joystick.

Figure 18:
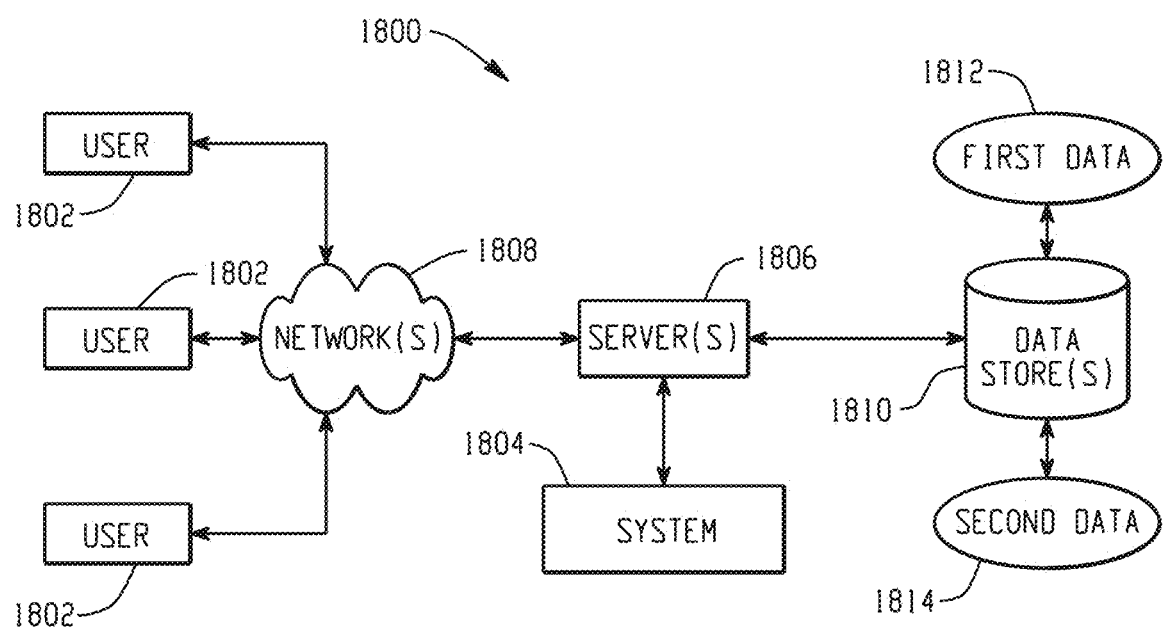

FIG. 18 depicts at 1800 a computer-implemented environment wherein users 1802 can interact with a system 1804 hosted on one or more servers 1806 through a network 1808. The system 1804 contains software operations or routines. The users 1802 can interact with the system 1804 through a number of ways, such as over one or more networks 1808. One or more servers 1806 accessible through the network(s) 1808 can host system 1804. It should be understood that the system 1804 could also be provided on a stand-alone computer for access by a user.

Systems and methods as described herein may be performed using a simulation engine, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes (e.g., the behavior of the one or more objects in the region of interest, the behavior of radar waves approximated by one or more rays transmitted in the simulation). The models represent behaviors of the system, while the simulation represents the operation of the system over time. A simulation result represents a characteristic of the physical system, as represented by the simulation, at one or more point within the simulation (e.g., at the end of the simulation, at t=35 seconds into the simulation).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. In particular embodiments, a non-transitory computer- or machine-readable medium may be encoded with instructions in the form of machine instructions, hyper-text markup language based instructions, or other applicable instructions to cause one or more data processors to perform operations. As used herein, the term "machine-readable medium" (or "computer-readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of meshing a model of a physical assembly, comprising:
    (a) creating a base mesh of the model, the base mesh including a first domain and a second domain, the first domain adjacent to the second domain via a boundary having boundary nodes;
    (b) performing a parallel mesh refinement by:
        (i) creating by a first computer processor a first refined domain mesh based on the first domain with boundary nodes indicated as frozen; and
        (ii) creating by a second computer processor a second refined domain mesh based on the second domain with boundary nodes indicated as frozen; and
    (c) performing a boundary mesh mapping of the first refined domain mesh and the second refined domain mesh to generate a conformal refined mesh of the model by:
        (i) adding, to the first refined domain mesh, first additional nodes along a first boundary, wherein the first additional nodes were not along the first boundary during parallel mesh refinement of the first refined domain mesh; and
        (ii) adding, to the second refined domain mesh, second additional nodes along a second boundary, wherein the second additional nodes were not along the second boundary during parallel mesh refinement of the second refined domain mesh;
    wherein the nodes added to the first refined domain mesh correspond to points on the first boundary that are nodes of an element in the second domain, and the nodes added to the second refined domain mesh correspond to points on the second boundary that are nodes of an element in the first domain.

2. The method of claim 1, wherein the parallel mesh refinement is performed without synchronization of the first domain mesh and the second domain mesh between the first computer processor and the second computer processor.

3. The method of claim 1, wherein the first domain comprises a misalignment with elements of the base mesh, further comprising shrinking the base mesh to correct the misalignment between the base mesh of the model and the first domain such that element edges in the first domain do not cross the boundary.

4. The method of claim 3, wherein shrinking the base mesh comprises adjusting a size of elements in overlapping boundaries.

5. The method of claim 1, further comprising causing the conformal refined mesh to be rendered via a graphical display.

6. The method of claim 1, further comprising mapping base mesh to bound domains, and decomposing mesh of bound domains into a first bound domain mesh and a second bound domain mesh, wherein the first domain comprises the first bound domain mesh, and the second domain comprises the second bound domain mesh.

7. The method of claim 1, further comprising configuring an overlapping mesh for a component, decomposing an island mesh group, and decomposing a geometry object to a component domain, wherein the first domain comprises the island mesh group and the second domain comprises an excluded bound domain.

8. The method of claim 1, further comprising combining the first domain and the second domain into a single domain, pre-meshing the boundary between the first domain and the second domain to create a clean interface between the first domain and the second domain, and decomposing the single domain into the first domain and the second domain at the clean interface, wherein geometry features of the first domain and of the second domain align at the boundary between the first domain and the second domain.

9. The method of claim 1, wherein the model comprises a component domain with a plurality of objects, and wherein creating a base mesh of the model comprises:
    (a) dividing the component domain into a first set of objects and a second set of objects;
    (b) identifying a domain interface between the first set of objects and the second set of objects and meshing the domain interface; and
    (d) decomposing the component domain into a first sub-domain and a second sub-domain, wherein the first part of the base mesh comprises the first sub-domain, the second part of the base mesh comprises the second sub-domain, and the boundary between the first domain and the second domain comprises the domain interface.

10. A system for meshing a model of a physical assembly, comprising one or more processors configured to:
    (a) create a base mesh of the model, the base mesh including a first domain and a second domain, the first domain adjacent to the second domain via a boundary having boundary nodes;
    (b) perform a parallel mesh refinement comprising:
        (i) creating by a first computer processor a first refined domain mesh based on the first domain with boundary nodes indicated as frozen; and (ii) creating by a second computer processor a second refined domain mesh based on the second domain with boundary nodes indicated as frozen; and (c) perform a boundary mesh mapping of the first refined domain mesh and the second refined domain mesh to generate a conformal refined mesh of the model, comprising:

(i) adding, to the first refined domain mesh, first additional nodes along a first boundary, wherein the first additional nodes were not along the first boundary during parallel mesh refinement of the first refined domain mesh; and (ii) adding, to the second refined domain mesh, second additional nodes along a second boundary, wherein the second additional nodes were not along the second boundary during parallel mesh refinement of the second refined domain mesh;

wherein the nodes added to the first refined domain mesh correspond to points on the first boundary that are nodes of an element in the second domain, and the nodes added to the second refined domain mesh correspond to points on the second boundary that are nodes of an element in the first domain.

11. The system of claim 10, wherein the parallel mesh refinement is performed without synchronization of the first domain mesh and the second domain mesh between the first computer processor and the second computer processor.

12. The system of claim 10, wherein the first domain comprises a misalignment with elements of the base mesh, wherein the one or more processors are further configured to shrink the base mesh to correct the misalignment between the base mesh of the model and the first domain such that element edges in the first domain do not cross the boundary.

13. The system of claim 10, further comprising causing the conformal refined mesh to be rendered via a graphical display.

14. A method of meshing a model of a physical assembly, comprising:

(a) generating a base mesh based of the model, wherein the base mesh comprises at least a first domain and a second domain sharing a boundary comprised of boundary nodes;

(b) performing a mesh refinement by:

(i) creating a first refined domain mesh based on the first domain with boundary nodes indicated as frozen; and (ii) creating a second refined domain mesh based on the second domain with boundary nodes indicated as frozen;

(c) performing a boundary mesh mapping to create a conformal refined mesh by exchanging additional boundary nodes between the first refined domain mesh and the second refined domain mesh, wherein the additional boundary nodes correspond to points on a domain boundary of a recipient refined domain mesh that are nodes of an element within a donor refined domain mesh;

(d) generating a global conformal mesh based on the conformal refined mesh by:

(i) performing surface recovery and solid ID assignment for the first refined domain mesh to create a first recovered surface set and a first solid ID set;

(ii) performing surface recovery and solid ID assignment for the second refined domain mesh to create a second recovered surface set and a second solid ID set; and (iii) combining the first recovered surface set and the second recovered surface set, and combining the first solid ID set and the second solid ID set.

15. The method of claim 14, further comprising generating the global conformal mesh in parallel by:

(a) performing surface recovery and solid ID assignment for the first refined domain mesh using a first computer processor; and (b) performing surface recovery and solid ID assignment for the second refined domain mesh using a second computer processor.

16. The method of claim 14, further comprising performing the mesh refinement in parallel by:

(a) creating the first refined domain mesh based on the first domain with boundary nodes indicated as frozen using a first computer processor; and (b) creating the second refined domain mesh based on the second domain with boundary nodes indicated as frozen using a second computer processor.

17. The method of claim 14, wherein data is not exchanged between the first domain and the second domain when performing the mesh refinement, and wherein data is not exchanged between the first domain and the second domain when performing surface recover and solid ID assignment for the first refined domain mesh and the second refined domain mesh.

18. The method of claim 14, further comprising generating the base mesh in parallel by:

(a) generating the first domain using a first computer processor; and (b) generating the second domain using a second computer processor.

* * * * *